United States Patent
Morikawa

(10) Patent No.: US 9,900,467 B2
(45) Date of Patent: Feb. 20, 2018

(54) IMAGE READING APPARATUS THAT PERFORMS SHADING CORRECTION, METHOD OF CONTROLLING THE SAME, AND STORAGE MEDIUM

(71) Applicant: CANON KABUSHIKI KAISHA, Tokyo (JP)

(72) Inventor: Daisuke Morikawa, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/287,784

(22) Filed: Oct. 7, 2016

(65) Prior Publication Data

US 2017/0026548 A1    Jan. 26, 2017

Related U.S. Application Data

(63) Continuation of application No. 14/676,206, filed on Apr. 1, 2015, now Pat. No. 9,491,321.

(30) Foreign Application Priority Data

Apr. 2, 2014   (JP) .................... 2014-076172

(51) Int. Cl.
H04N 1/04    (2006.01)
H04N 1/409   (2006.01)
H04N 1/00    (2006.01)

(52) U.S. Cl.
CPC ....... H04N 1/4097 (2013.01); H04N 1/00092 (2013.01); H04N 1/00689 (2013.01);
(Continued)

(58) Field of Classification Search
CPC ............. H04N 1/4097; H04N 1/00729; H04N 1/00763; H04N 1/00092
(Continued)

(56) References Cited

U.S. PATENT DOCUMENTS 7,518,757 B2 * 4/2009 Chizawa ............... G06T 7/0004
358/461

FOREIGN PATENT DOCUMENTS

JP    2003032452 A    1/2003
JP    2004207790 A    7/2004
(Continued)

OTHER PUBLICATIONS

Office Action issued in U.S. Appl. No. 14/676,206, mailed Dec. 17, 2015.
(Continued)

*Primary Examiner* — Houshang Safaipour
(74) *Attorney, Agent, or Firm* — Rossi, Kimms & McDowell LLP

(57) ABSTRACT

An image reading apparatus that makes it possible to reduce the influences of dirt on a white reference chart itself, stripes caused by dust, and the like, and thereby generate accurate data for shading correction. An image processor performs shading correction on image data read by a reader unit. The read image data is compared with threshold values set for each pixel, and a pixel which is out of a range of the threshold values is determined as a singular point pixel. Data of a pixel determined as a singular point pixel is interpolated from data around the singular point pixel. Data of a pixel which is not determined as a singular point pixel is adopted as valid shading correction data. An operation controller controls the number of effective sampling lines from start to termination of sampling to be performed.

4 Claims, 17 Drawing Sheets

(52) U.S. Cl.
CPC ..... *H04N 1/00729* (2013.01); *H04N 1/00763* (2013.01); *H04N 1/00769* (2013.01); *H04N 1/00798* (2013.01); *H04N 2201/0081* (2013.01); *H04N 2201/0094* (2013.01)

(58) Field of Classification Search
USPC ................................ 358/1.9, 461, 474, 1.15
See application file for complete search history.

(56) References Cited

FOREIGN PATENT DOCUMENTS

| | | |
|---|---|---|
| JP | 2006217481 A | 8/2006 |
| JP | 2011151478 A | 8/2011 |

OTHER PUBLICATIONS

Notice of Allowance issued in U.S. Appl. No. 14/676,206, mailed Jul. 11, 2016.

\* cited by examiner

IMAGE READING APPARATUS THAT PERFORMS SHADING CORRECTION, METHOD OF CONTROLLING THE SAME, AND STORAGE MEDIUM

BACKGROUND OF THE INVENTION

Field of the Invention

The present invention relates to an image reading apparatus that performs shading correction, a method of controlling the image reading apparatus, and a storage medium.

Description of the Related Art

Generally, in an image reading apparatus that reads an original image using a reading sensor, such as a CCD and a CMOS, mismatching called shading is sometimes caused between an original luminance of an image and a read signal. More specifically, mismatching is caused by the influences of variation in reading characteristics of reading elements constituting the reading sensor, occurring on a pixel-by-pixel basis, unevenness of distribution of the amount of light in a main scanning direction, which is emitted from a light source for irradiating an original, distortion characteristics of a condensing lens that condenses light reflected from the original onto the reading sensor, and so on.

As a method of correcting mismatching in such a read image to thereby make the whole image uniform in brightness in plane on average, shading correction is generally performed. Shading correction generally employs a method in which a white reference member whose chromaticity is controlled is set within an image reading apparatus as an object from which target values of uniform brightness in shading correction are to be obtained, the white reference member is read before the start of reading an image of an original, and shading correction data is generated based on the reading result.

By the way, an image reading apparatus equipped with a first reading unit configured to read a front side of an original and a second reading unit configured to read a reverse side of the original is capable of reading both of the front and reverse sides of the original only by conveying the original once. In the image reading apparatus having such an original double-sided reading function, the second reading unit is usually provided in an original conveying section of the image reading apparatus, which makes it difficult to secure a space for disposing the white reference member. Therefore, in many cases, shading correction data is generated using a white reference document.

Conventionally, in the image reading apparatus equipped with the above-mentioned first reading unit and second reading unit, there has been proposed a method of creating second white reference data (see e.g. Japanese Patent Laid-Open Publication No. 2004-207790). In the apparatus described in Japanese Patent Laid-Open Publication No. 2004-207790, the second white reference data is created based on initial white reference data obtained by reading a second white reference member by the second reading unit and background data of an original obtained by reading the original by the second reading unit. By employing this method, it is possible to relax positional restrictions for providing the second white reference member within the image reading apparatus, and it is possible to simplify the apparatus construction.

Further, in an apparatus described in Japanese Patent Laid-Open Publication No. 2006-217481, whiteness correction data is generated based on a difference between data of respective pixels at the same position of initial second white reference member-read data and white reference document data, and second shading correction data is generated based on the generated whiteness correction data. Note that the initial second white reference member-read data is data obtained by reading a second white reference member which is disposed on an opposed surface to a second reading unit configured to read the second side of an original. Further, the white reference document data is data obtained by reading, using the second reading unit, a white reference document which is made of a material having whiteness at approximately the same level as that of a first white reference member disposed in the vicinity of a platen glass for a movable first reading unit.

Further, in an apparatus described in Japanese Patent Laid-Open Publication No. 2011-151478, first reference image data obtained by reading a white reference chart and second reference image data obtained by reading a white reference board are stored when the apparatus is shipped from the factory or when the apparatus is subjected to maintenance. Third reference image data obtained by reading the white reference board after the apparatus is powered on and before an original image is read is multiplied by the first reference image data, and is also divided by the second reference image data to thereby determine a correction value for shading correction. By employing this method, it becomes unnecessary to read the white reference chart whenever shading correction is performed, which makes it possible to perform accurate shading correction at desired timing.

However, in the apparatus described in Japanese Patent Laid-Open Publication No. 2004-207790, data used for shading correction may be largely varied depending on a condition of the background of an original. More specifically, in a case where an area on the original, including characters and a diagram, is read, data formed by reading portions including dust or stripes also forms part of the data for shading correction. Further, the data for shading correction is also varied in a case where a sheet having a background which is not white, such as colored paper, is used as an original, or a case where stripes are generated because dust, such as paper dust, remaining within an original conveying section of the image reading apparatus is attached to an original during conveyance of the original and is fixed at or floats around an original reading position. In these cases, it is impossible to acquire accurate shading correction data to be served as target values of uniform brightness which is the aim of shading correction.

Further, in the case of the apparatus described in Japanese Patent Laid-Open Publication No. 2006-217481, it is difficult to cause a position at which the white reference document is read by the first reading unit and a position at which reading is performed by the second reading unit to coincide with each other, when influences of original conveying accuracy and variation and aging of members constituting the apparatus are taken into account. Further, the first and second reading units are disposed at respective desired positions within the original conveying section of the image reading apparatus, and hence a condition of attachment of dust to each reading position is different, which makes different the position and the number of stripes generated from the dust.

Therefore, as shown in FIG. 17, in a case where the following stripes are generated when the white reference document is being conveyed, it is impossible to generate accurate data for shading correction. More specifically, in a case where the above-mentioned stripes caused by dust are generated on different positions on a front side of the original read by the first reading unit and a reverse side read by the second reading unit, it is impossible to generate accurate data for shading correction. FIG. 17 shows an example in which stripes caused by floating dust and a stripe caused by fixed dust are generated on the different positions on the front side image and the reverse side image, respectively.

Further, in the apparatus described in Japanese Patent Laid-Open Publication No. 2011-151478, if the first reference image data itself, based on which the shading correction data is calculated, is influenced by dirt of the white reference chart or stripes caused by dust generated during conveyance of the chart, there arises a problem that even if the shading correction data can be generated at a desired timing thereafter, accurate shading correction cannot be expected.

That is, even when any one of the methods disclosed in the above Japanese Patent Laid-Open Publication No. 2004-207790 and Japanese Patent Laid-Open Publication No. 2006-217481 is employed, unless data for shading correction is acquired in a state where strict management is executed with respect to dirt on the white reference chart to be used and dirt within the image reading apparatus, the effect of shading correction is largely reduced.

SUMMARY OF THE INVENTION

The present invention provides an image reading apparatus that makes it possible to reduce the influences of dirt on a white reference chart itself, stripes caused by dust, and the like, and thereby generate accurate data for shading correction, a method of controlling the same, and a storage medium.

In a first aspect of the present invention, there is provided an image reading apparatus comprising a reading unit configured to read an image of an object to be read including an original, a correction unit configured to perform shading correction on image data read by the reading unit, a determination unit configured to compare image data read by the reading unit with threshold values and determine a pixel which is out of a range of the threshold values as a singular point pixel, a setting unit configured to set threshold values used by the determination unit, for each pixel, an interpolation unit configured to interpolate data of a pixel determined to be a singular point pixel by the determination unit, from data of pixels around the singular point pixel, a sampling unit configured to adopt data of a pixel which is not determined to be a singular point pixel by the determination unit, as valid shading correction data, and a control unit configured to control the number of effective sampling lines from start to termination of sampling to be performed by the sampling unit on image data read by the reading unit.

In a second aspect of the present invention, there is provided a method of controlling an image reading apparatus including a reading unit configured to read an image of an object to be read including an original, comprising performing shading correction on image data read by the reading unit, comparing image data read by said reading unit with threshold values to thereby determine a pixel which is out of a range of the threshold values as a singular point pixel, setting threshold values used by said determining, for each pixel, interpolating data of a pixel determined to be a singular point pixel by said determining, from data around the singular point pixel, adopting data of a pixel which is not determined to be a singular point pixel by said determining, as valid shading correction data, and controlling the number of effective sampling lines from start to termination of sampling to be performed by said sampling on image data read by the reading unit.

In a third aspect of the present invention, there is provided a non-transitory computer-readable storage medium storing a computer-executable program for executing a method of controlling an image reading apparatus including a reading unit configured to read an image of an object to be read including an original, wherein the control method comprises shading correction on image data read by the reading unit, comparing image data read by said reading unit with threshold values to thereby determine a pixel which is out of a range of the threshold values as a singular point pixel, setting threshold values used by said determining, for each pixel, interpolating data of a pixel determined to be a singular point pixel by said determining, from data around the singular point pixel, adopting data of a pixel which is not determined to be a singular point pixel by said determining, as valid shading correction data, and controlling the number of effective sampling lines from start to termination of sampling to be performed by said sampling on image data read by the reading unit.

According to the present invention, it is possible to reduce the influences of dirt of a white reference chart itself, stripes caused by dust generated during conveyance of the chart, or the like, and thereby generate data for shading correction with high accuracy.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
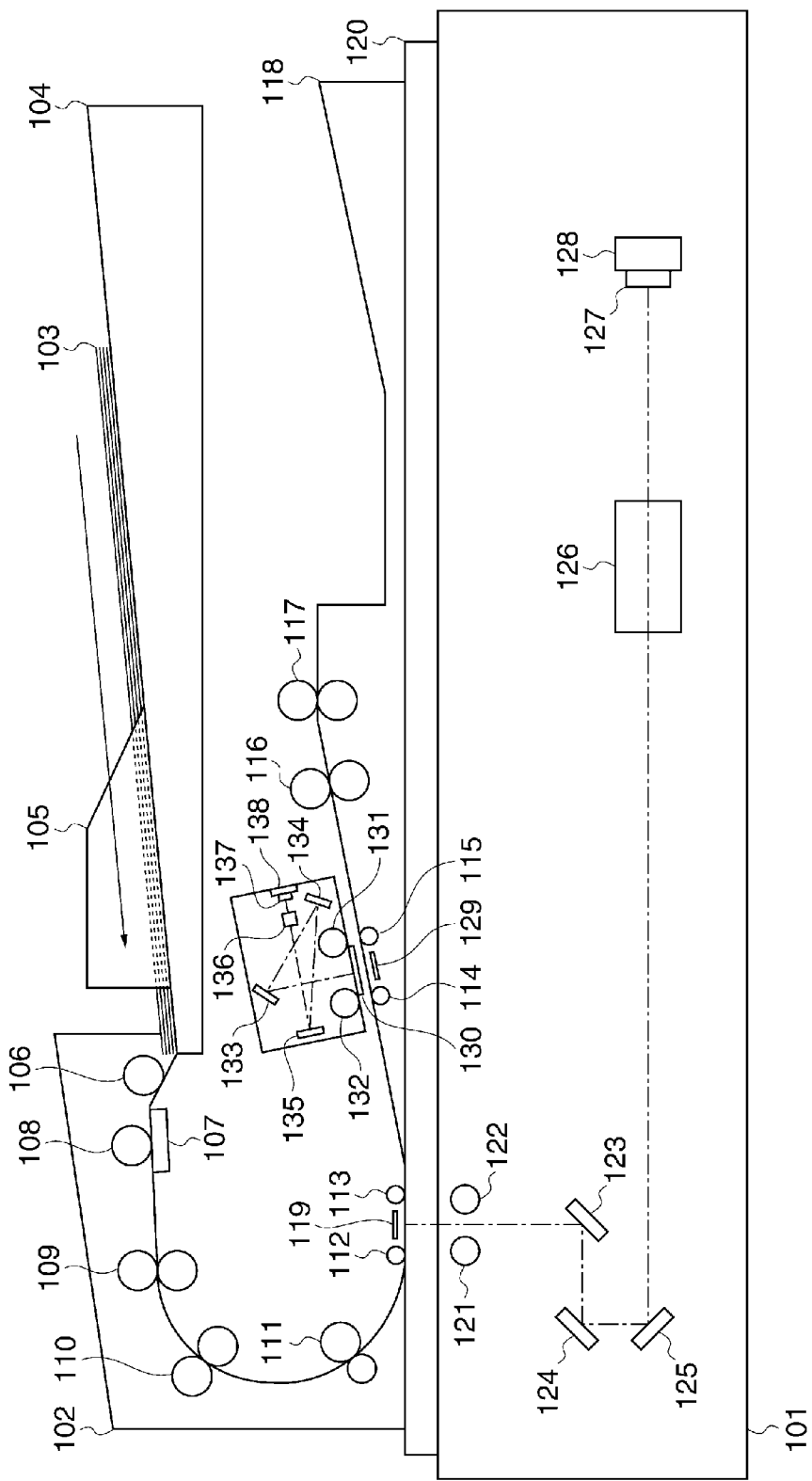
FIG. 1 is a schematic constitution diagram of an image reading apparatus according to an embodiment.

FIG. 1 is a schematic constitution diagram of an image reading apparatus according to the present embodiment.

Referring to FIG. 1, the image reading apparatus is comprised of a reader unit 101 that reads an object to be read (an original, a white reference chart, etc.), and an auto document feeder (hereinafter referred to as the ADF) 102 that conveys an object to be read. The reader unit 101 includes light sources 121 and 122, reflecting mirrors 123, 124, and 125, an imaging lens 126, a line sensor 127, a signal processing board 128, and so forth. The ADF 102 includes a document tray 104, width regulating plates 105, a separation pad 107, various rollers 106, 108, 109, 110, 111, 112, 113, 114, 115, 116, and 117, white opposed members 119 and 129, a line sensor 137, a document discharge tray 118, and so forth.

First, a processing flow for conveying, reading, and discharging an original will be described. An original bundle 103 is set on the document tray 104 of the ADF 102, and is brought into abutment with the width regulating boards 105, whereby skewed conveyance of each original sheet is prevented. The original bundle 103 is conveyed to a separation section by the pickup roller 106. Each uppermost sheet of the original bundle 103 is separated one by one from the original bundle 103 by the separation pad 107 and the separation roller 108 at the separation section. One separated original sheet has a conveyance skew corrected by the first resist roller 109 and is conveyed by the second resist roller 110, the first conveying roller 111, the second conveying roller 112, and the third conveying roller 113, in this order sequentially.

When the original sheet passes the second conveying roller 112 and the third conveying roller 113, the original sheet passes over a first reading position. Image information of a front side of the original sheet passing the first reading position is read by the line sensor 127. After passing the third conveying roller 113, the original sheet is conveyed by the fourth conveying roller 114 and the fifth conveying roller 115, and at this time, the original sheet passes over a second reading position. Image information of a reverse side of the original passing the second reading position is read by the line sensor 137. Then, the original sheet is conveyed by the sixth conveying roller 116 and the discharging roller 117, and is discharged onto the document discharge tray 118.

Next, an operation for reading the front side of the original will be described. When the original is passing between the white opposed member 119 and a reading glass 120 which are disposed at the first reading position, the original sheet is irradiated by the light sources 121 and 122 of the reader unit 101, and the reflected light is guided to the imaging lens 126 by the reflecting mirrors 123, 124, and 125. The light converged by the imaging lens 126 forms an image on the line sensor 127 (reading unit) comprised of image pickup devices, such as CCDs, arranged on a line. An optical signal forming the image is converted to an electric signal by the line sensor 127, and is converted to a digital signal by the signal processing board 128, and then, image processing is performed on the digital signal.

Next, an operation for reading the reverse side of the original sheet will be described. When the original sheet is passing between the white opposed member 129 and a reverse-side reading glass 130 which are disposed at the second reading position, the original sheet is irradiated by light sources 131 and 132, provided within the ADF 102, and the reflected light is guided to an imaging lens 136 by reflecting mirrors 133, 134, and 135. The light converged by the imaging lens 136 forms an image, similarly to the case of the front side, on the line sensor 137 comprised of image pickup devices, such as CCDs, arranged on a line. The optical signal forming the image is converted to an electric signal by the line sensor 137, and is converted to a digital signal by a signal processing board 138, and then, image processing is performed on the digital signal.

It is general to use a common reading unit for reading a front side of an original sheet both in a moving image reading operation for reading an original sheet being conveyed and in a platen reading operation for reading an original sheet set on the reading glass 120. In the platen reading operation, the light sources 121 and 122, and the reflecting mirror 123 are moved from left to right, as viewed in FIG. 1, whereby the line sensor 127 reads the original sheet set on the reading glass 120. On the other hand, when reading the front side of the original sheet in the moving image reading operation, the light sources 121 and 122, and the reflecting mirror 123 are moved such that the reading position is set to the first reading position, and then the line sensor 137 reads the original conveyed to the first reading position.

On the other hand, a unit that reads a reverse side of an original in the moving image reading operation is fixedly disposed in a casing of the ADF because the unit is not particularly required to be moved.

Figure 2:
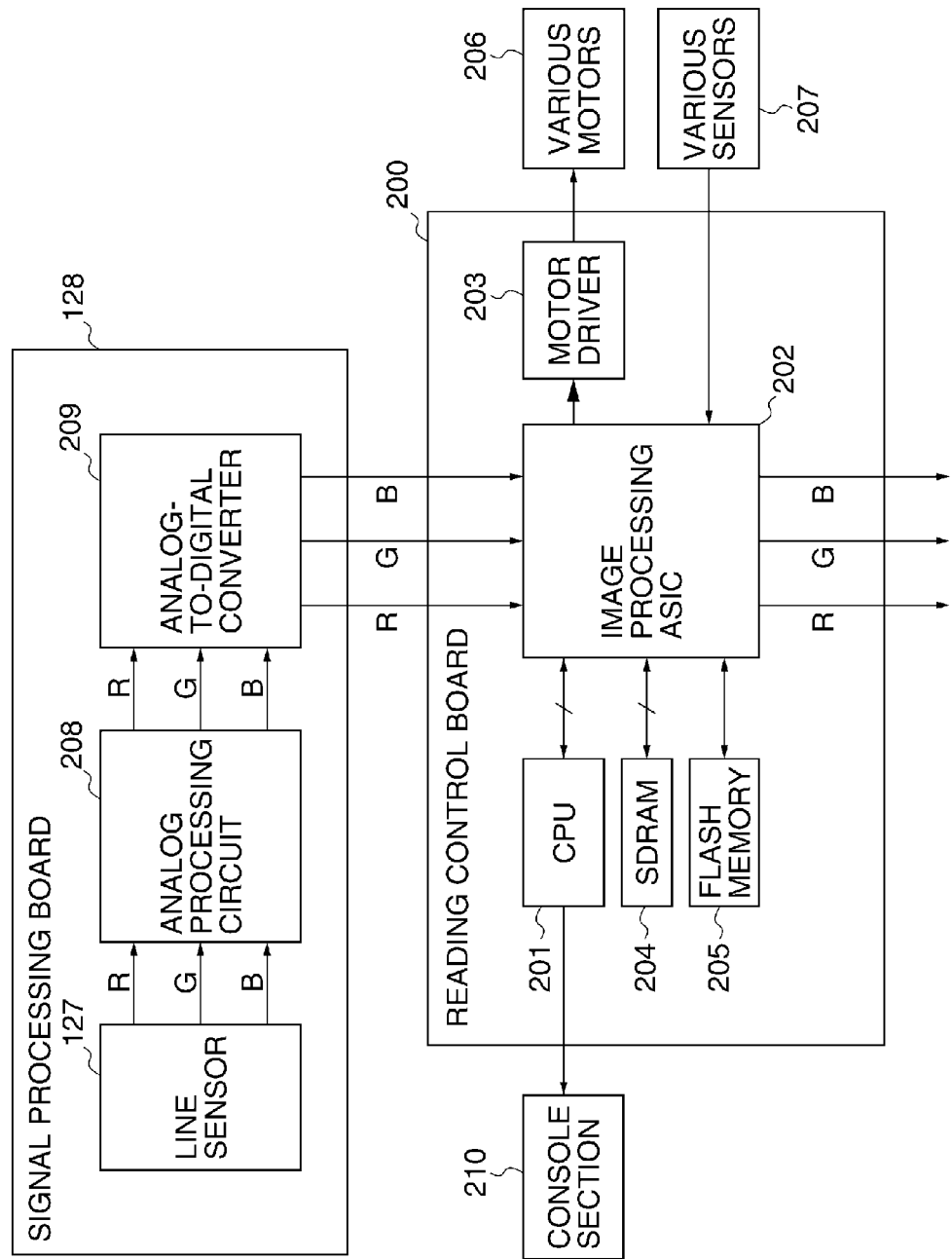
FIG. 2 is a block diagram of a reading control board and a signal processing board of the image reading apparatus.

FIG. 2 is a block diagram of a reading control board and the signal processing board of the image reading apparatus.

Referring to FIG. 2, the signal processing board 128 has the line sensor 127, an analog processing circuit 208, an analog-to-digital converter 209, and so forth, mounted thereon. Scattered light reflected from an original irradiated with light from the light sources passes through an optical system including the reflecting mirrors, etc. appearing in FIG. 1 and is photoelectrically converted by the line sensor 127, and analog image signals obtained by photoelectric conversion are subjected to offset and gain adjustment by the analog processing circuit 208. The analog-to-digital converter 209 disposed downstream of the analog processing circuit 208 converts the analog image signals adjusted by the analog processing circuit 208 to digital image signals. The converted digital image signals are input to an image processing ASIC (Application Specific Integrated Circuit) 202 of the reading control board denoted by reference numeral 200.

The reading control board 200 has a CPU 201, the image processing ASIC 202, a motor driver 203, an SDRAM 204, a flash memory 205, and so forth, mounted thereon. Input signals from various sensors 207 and control signals output to various motors 206 of the image reading apparatus, neither of which is shown in FIG. 1, are controlled by the image processing ASIC 202 or the CPU 201. The CPU 201 executes setting for various operations of the image processing ASIC 202, and the like. Further, the CPU 201 executes control programs to thereby perform processes illustrated in respective flowcharts described hereinafter. A console section 210 is capable of displaying various settings set to the image reading apparatus, and various messages based on the control of the CPU 201.

The image processing ASIC 202 having received the various operation settings from the CPU 201 executes various image processing on the digital image signals input from the analog-to-digital converter 209. When performing image processing, the image processing ASIC 202 exchanges various control signals and image signals also with the SDRAM 204 so as to temporarily store the image signals. Further, part of the various setting values of the image processing ASIC 202 and the image processing parameters are stored in the flash memory 205, and the stored data and parameters are read and used as required.

A series of image reading operations are performed by starting image processing using a command from the CPU 201 or a sensor signal input to the image processing ASIC 202 as a trigger, and outputting control pulses to the motor driver 203 for controlling the various motors 206. The image data subjected to various image processing by the image processing ASIC 202 are passed to a main control board (not shown) disposed downstream of the reading control board 200.

Figure 3:
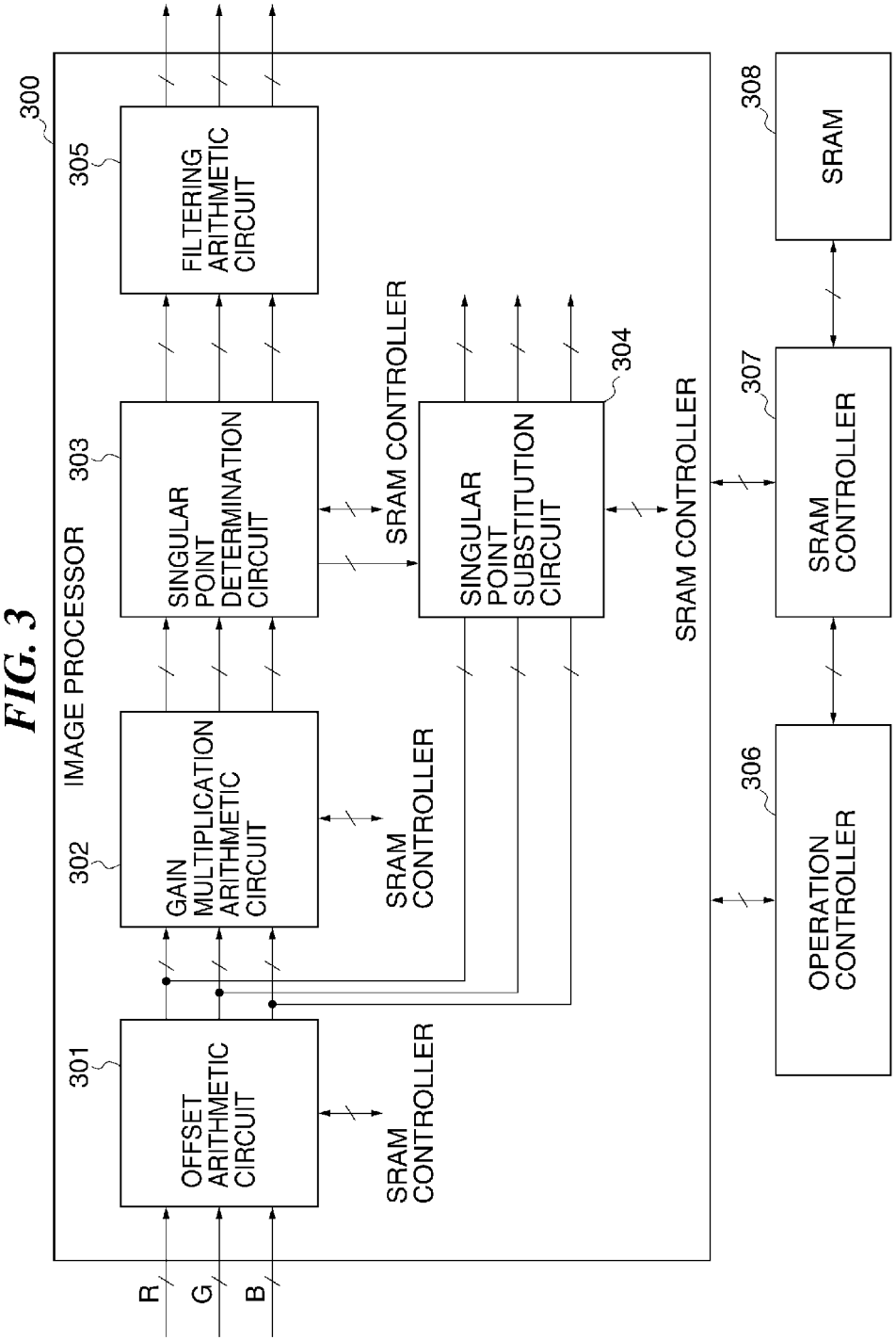
FIG. 3 is a block diagram of a shading correction processing system of the image reading apparatus.

FIG. 3 is a block diagram of circuits for executing shading correction processing as components of an image processor 300 in the image processing ASIC 202 of the image reading apparatus.

Referring to FIG. 3, the image processor 300 includes an offset arithmetic circuit 301, a gain multiplication arithmetic circuit 302, a singular point determination circuit 303, a singular point substitution circuit 304, and a filtering arithmetic circuit 305. The image processor 300 functions as a correction unit configured to perform shading correction on read image data. The offset arithmetic circuit 301 corrects variation between pixels in dark-time outputs (R, G, B) from the line sensor 127. The gain multiplication arithmetic circuit 302 corrects variation between pixels in bright-time outputs from the line sensor 127 on which are superposed light distribution of the light source 121 in the main scanning direction and reduced light amount in the peripheral part caused by the imaging lens 126.

The singular point determination circuit 303 compares the luminance value of each pixel of a read image with predetermined threshold values, and determines a pixel which is larger or smaller than an upper or lower threshold value as a singular point pixel. In doing this, the singular point determination circuit 303 compares image data read from an object to be read with the threshold values, and determines a pixel which is out of a range defined by the upper and lower threshold values (pixel which is larger or smaller in luminance value than the upper or lower threshold value: pixel which is out of the range defined by the upper and lower threshold values) as a singular point pixel. Further, the singular point determination circuit 303 functions as a setting unit configured to set a threshold value for each pixel. Further, the singular point determination circuit 303 uses shading correction data stored in an SRAM 308 (second storage unit) in determining whether the pixel is a singular point pixel.

The singular point substitution circuit 304 receives information indicative of a result of determination performed by the singular point determination circuit 303, and substitutes data for the singular point pixel using a predetermined method. In doing this, the singular point substitution circuit 304 interpolates data of the pixel determined as the singular point pixel by the singular point determination circuit 303, from data of pixels around the singular point pixel. Further, the singular point substitution circuit 304 functions as an interpolation unit configured to interpolate data of a pixel determined as a singular point pixel by the determination unit from data of pixels around the singular point pixel. The filtering arithmetic circuit 305 performs filtering arithmetic operation processing on output signals from the singular point determination circuit 303.

An operation controller 306 sets ON/OFF of various arithmetic operations and various parameters to the respective arithmetic circuits in the image processor 300, and sets the operation settings to an SRAM controller 307. The operation controller 306 functions as a control unit configured to control the number of effective sampling lines from the start to termination of sampling of image data read by the reading unit by the sampling unit.

The SRAM controller 307 executes data-writing into and data-reading from the SRAM 308 of the image processing ASIC 202 based on commands from the operation controller 306. The SRAM controller 307 functions as a sampling unit configured to adopt data of a pixel which is not determined as a singular point pixel by the determination unit as valid shading correction data. The various arithmetic circuits of the image processor 300 are also connected to the SRAM controller 307. The SRAM controller 307 reads out an offset coefficient, a gain coefficient, a singular point determination threshold reference value, and so on, stored in the SRAM 308 for each pixel from the SRAM 308, as required, and performs necessary arithmetic operations based on the read values and input image signals.

The offset arithmetic circuit 301 subtracts the offset values stored in the SRAM 308 from data of all associated pixels in the main scanning direction (main scanning pixels) based on the input image signal, by the following equation (1):

$$O\_DATA[x]=I\_DATA[x]-BW\_RAM\_DATA[x] \qquad (1)$$

In the equation (1), x represents a position in the main scanning direction, O_DATA represents data output from the offset arithmetic circuit 301, and I_DATA represents data input to the offset arithmetic circuit 301. BW_RAM_DATA represents black shading correction data. BW_RAM_DATA can be calculated from data which is obtained by summation of data sampled from dark-time output data formed by analog-to-digital conversion of the output from the line sensor 127, with respect to each of pixels at respective identical positions in the main scanning direction over a plurality of lines, and dividing the summation result obtained for each pixel at the identical position by the number of lines for which the data has been acquired, by the following equation (2):

$$BW\_RAM\_DATA[x]=\text{average value}[x] \text{ of data obtained by sampling summation}-BW\_TARGET \qquad (2)$$

In the equation (2), BW_TARGET represents a target value of the dark-time output data. By executing this processing, unevenness of input image data between pixels on the dark side (side smaller in luminance value) is eliminated.

The gain multiplication arithmetic circuit 302 multiplies the input image signal by the gain value, by the following equation (3):

$$O\_DATA[x] = I\_DATA[x] \times WH\_RAM\_DATA[x] \quad (3)$$

In the equation (3), x represents a position in the main scanning direction, O_DATA represents data output from the gain multiplication arithmetic circuit 302, and I_DATA represents data input to the gain multiplication arithmetic circuit 302. WH_RAM_DATA represents white shading correction data. WH_RAM_DATA can be calculated from data (sampled data summation average value[x]) which is obtained by summation of data sampled from bright-time output data formed by analog-to-digital conversion of the output from the line sensor 127, with respect to each of pixels at respective identical positions in the main scanning direction over a plurality of lines, and dividing the summation result obtained for each pixel at the identical position by the number of lines for which the data has been acquired, by the following equation (4):

$$WH\_RAM\_DATA[x] = SHD\_TARGET + \text{average value} \\ [x] \text{ of data obtained by sampling summation} \quad (4)$$

In the equation (4), SHD_TARGET represents a target value of shading correction. By executing this processing, unevenness of input image data between pixels on the bright side (side larger in luminance value) can be eliminated.

The singular point determination circuit 303 performs a comparison operation between the input image signal and singular point determination threshold values for each of all the main scanning pixels by the following expressions (5) and (6):

$$OVER\_FLAG = 1 \ @I\_DATA[x] > OVER\_TH[x] \quad (5)$$
$$= 0 \ @I\_DATA[x] \leq OVER\_TH[x]$$

$$UNDER\_FLAG = 1 \ @I\_DATA[x] < UNDER\_TH[x] \quad (6)$$
$$= 0 \ @I\_DATA[x] \geq UNDER\_TH[x]$$

In the equations (5) and (6), x represents a position in the main scanning direction, and I_DATA represents data input to the singular point determination circuit 303. OVER_TH and UNDER_TH represent the singular point determination threshold values, respectively. When the input data is larger than OVER_TH, OVER_FLAG=1 is set, whereas when the input data is smaller than UNDER_TH, UNDER_FLAG=1 is set.

Although the singular point determination threshold values can be set to the same values for all pixels, it is possible to perform determination with higher accuracy through coping with variation between pixels by changing the singular point determination threshold values for each pixel. The singular point determination threshold values are changed by a method of storing data of each pixel, as a precondition of the singular point determination threshold values, in the SRAM 308, and setting the singular point determination threshold values by providing predetermined differences in luminance with respect to the data of each pixel. For example, assuming that the data stored in the SRAM, for the main scanning positions x=10 and 11, is 180 and 185, respectively, the upper limit threshold values are set to 190 and 195, and the lower limit threshold values are set to 170 and 175, respectively. Note that the output data O_DATA is data obtained by directly outputting I_DATA. By executing this processing, the singular point of the input image data is determined.

The singular point substitution circuit 304 determines continuity of pixels in the main scanning direction determined as the singular points, based on the singular point determination result output from the singular point determination circuit 303. That is, the singular point substitution circuit 304 determines a width of the singular points in the main scanning direction. After the width of the singular points is finalized, substitution processing is performed for a portion of the singular point pixels. Examples of the method of substitution processing include a method of simple substitution of data of adjacent pixels which are not singular point pixels, and a method for interpolating from data of adjacent pixels which are not singular points. The above-mentioned methods may be selectively employed according to a pixel width (width in terms of the number of pixels in the main scanning direction) of the singular points (singular point pixel width).

For example, the above-mentioned methods can be selectively applied in such a manner that when the singular point pixel width is less than 10 pixels, linear interpolation from the surrounding pixels is performed, and when the singular point pixel width is not less than 10 pixels, simple substitution is performed. By executing this processing, it is possible to acquire data formed by eliminating the singular points from the input image data.

Before describing shading correction according to the present embodiment, a general shading correction setting process will be described with reference to FIG. 16. Note that the singular point determination circuit 303 and the singular point substitution circuit 304, appearing in FIG. 3, are not used for the general shading correction data setting process.

Figure 16:
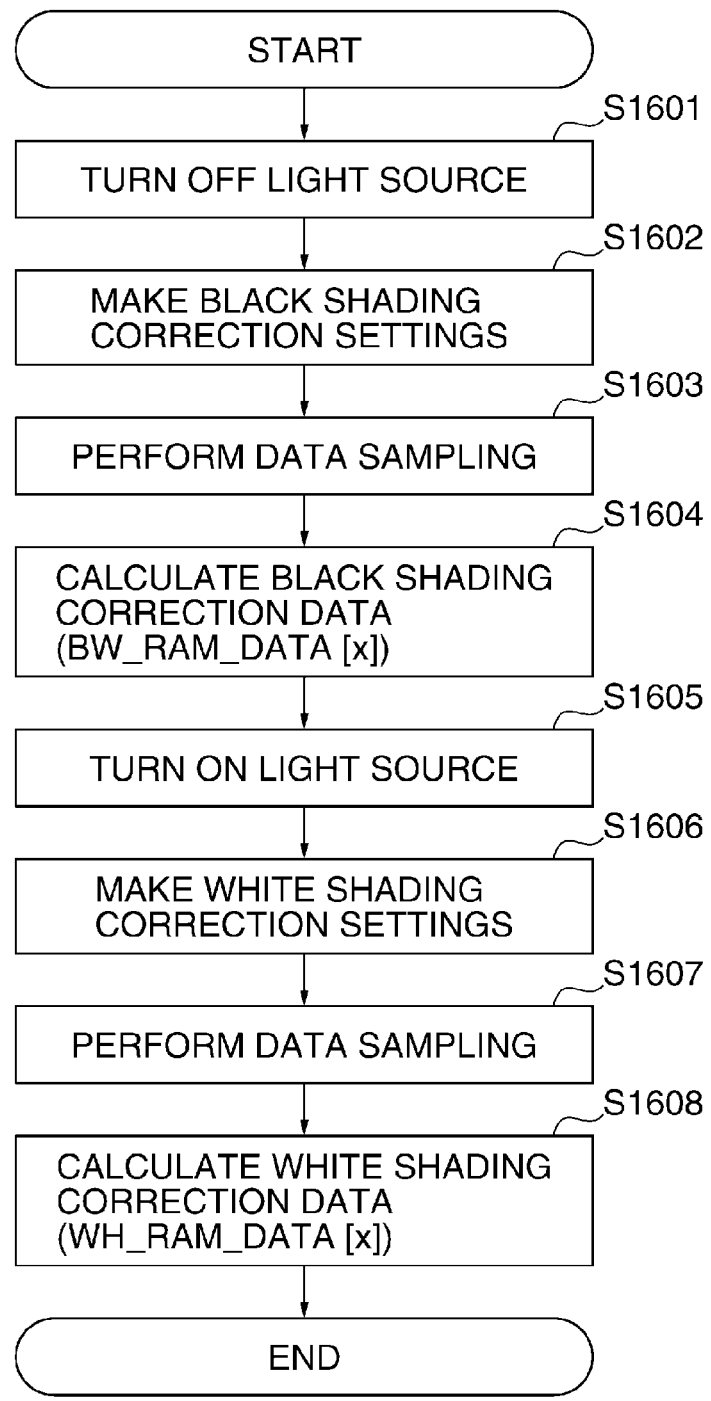
FIG. 16 is a flowchart of a general shading correction data setting process.
Figure 17:
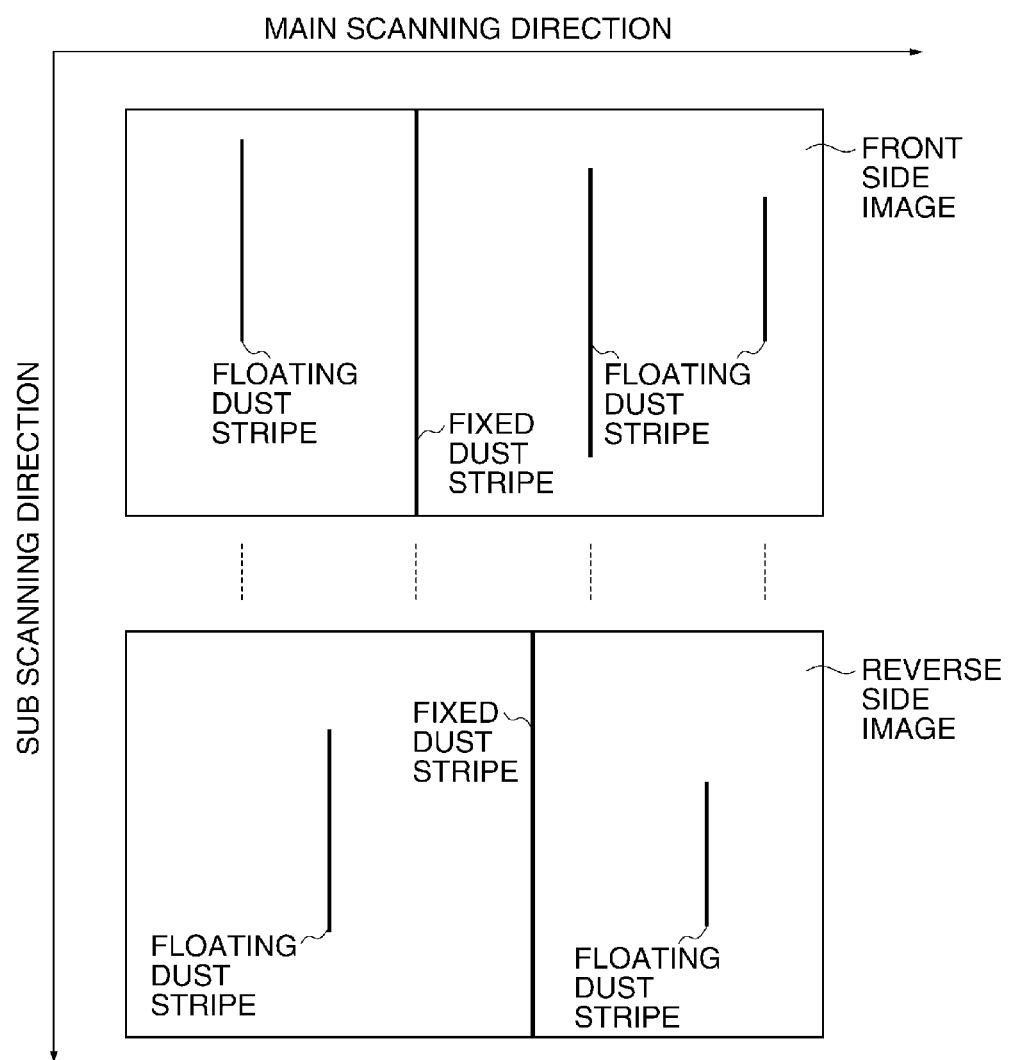
FIG. 17 is a diagram which is useful in explaining stripes formed on a front side image and a reverse side image due to dust.

FIG. 16 is a flowchart of the general shading correction data setting process. In the case of setting general shading correction data, a white reference board is used which is controlled such that dirt is difficult to stick thereto.

Referring to FIG. 16, the CPU 201 of the image reading apparatus extinguishes the light sources 121 and 122 or the light sources 131 and 132 (step S1601). The light sources 121 and 122 are light sources for the first reading unit that irradiate an original with light when reading a front side of the original at the first reading position, and the light sources 131 and 132 are light sources for the second reading unit that irradiate an original with light when reading a reverse side of the original at the second reading position. Next, the CPU 201 causes the operation controller 306 to make black shading correction settings for the arithmetic circuits appearing in FIG. 3 (step S1602). More specifically, the CPU 201 makes settings for the offset arithmetic circuit 301, the gain multiplication arithmetic circuit 302, the singular point determination circuit 303, and the singular point substitution circuit 304, such that none of these perform processing, i.e. processing-through settings.

Next, the CPU 201 performs sampling of data for generating black shading correction data (step S1603). More specifically, the CPU 201 causes the SRAM controller 307 to store data output from the singular point determination circuit 303 in the SRAM 308 based on the settings set in the step S1602. Note that at this time, the singular point determination circuit 303 does not perform singular point determination processing.

Next, the CPU 201 determines black shading correction data (BW_RAM_DATA[x]) from the data stored in the SRAM 308 by the equation (2) (step S1604). The black shading correction data obtained by the above conversion are data used for black shading correction, and are stored in the SRAM 308 as the storage unit.

Next, the CPU 201 lights the light sources extinguished in the step S1601 (step S1605).

Next, the CPU 201 causes the operation controller 306 to perform white shading correction settings for the respective arithmetic circuits appearing in FIG. 3 (step S1606), similarly to the step S1602. More specifically, the CPU 201 makes a setting for the offset arithmetic circuit 301 such that the offset arithmetic circuit 301 performs processing, and settings for the gain multiplication arithmetic circuit 302, the singular point determination circuit 303, and the singular point substitution circuit 304, such that none of these perform processing, i.e. processing-through settings.

Next, the CPU 201 performs sampling of data for generating white shading correction data (step S1607). More specifically, the CPU 201 causes the SRAM controller 307 to store data output from the singular point determination circuit 303 in the SRAM 308 based on the settings set in the step S1606.

Next, the CPU 201 determines white shading correction data (WH_RAM_DATA[x]) from the data stored in the SRAM 308 by the equation (4) (step S1608). The white shading correction data obtained by the above conversion are data used for white shading correction, and are stored in the SRAM 308 as the storage unit.

Now, a description will be given of a process for acquiring data for shading correction according to the present embodiment by the control of the respective arithmetic circuits appearing in FIG. 3 of the image processing ASIC 202 and the CPU 201 of the image reading apparatus. First, an outline of the process will be described, and then details of the same will be described.

Figure 4:
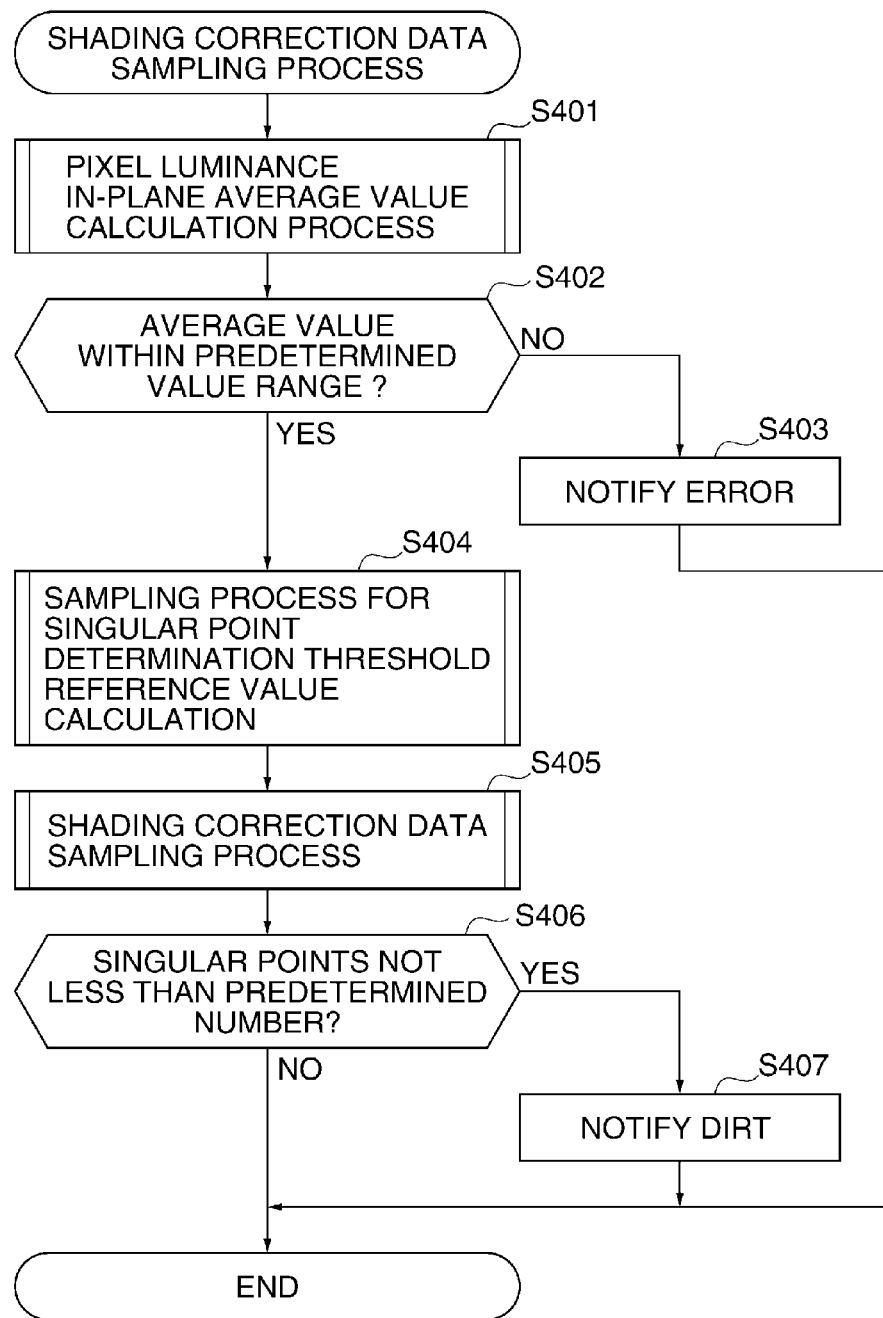
FIG. 4 is a flowchart of a shading correction data sampling process performed by a CPU of the image reading apparatus.

FIG. 4 is a flowchart of a shading correction data sampling process performed by the CPU 201 of the image reading apparatus according to the present embodiment.

Referring to FIG. 4, the CPU 201 of the image reading apparatus performs a pixel luminance in-plane average value calculation process (step S401). The pixel luminance in-plane average value calculation process will be described in detail with reference to FIG. 6 and other figures. A step S402 et seq. will be described hereinafter after describing the pixel luminance in-plane average value calculation process in FIG. 6. Shading correction data is sampled largely in the following three steps:

(1) sampling of data for calculating pixel luminance in-plane average values (2) sampling of data for calculating a singular point determination threshold reference value (3) sampling of data for creating shading correction data First, sampling of data for calculating the pixel luminance in-plane average values in the step (1) is performed so as to grasp conditions of a sheet from which sampling is to be performed from now on. More specifically, the step (1) is executed to prompt an operator of the image reading apparatus to change a sheet to be used, check the conditions of the image reading apparatus, and so forth, by notifying the operator of an error, in a case where sampled data is considered to be inappropriate for reference data for shading correction and not very useful in executing subsequent processing. Examples of the case where the sampled data is considered to be inappropriate for reference data for shading correction and not very useful in executing subsequent processing include a case where the read luminance is unbalanced between the RGB colors, a case where only bright data which indicates luminance values not lower than a predetermined value is obtained, or a case where only dark data which indicates luminance values not higher than a predetermined value is obtained.

Figure 9A:
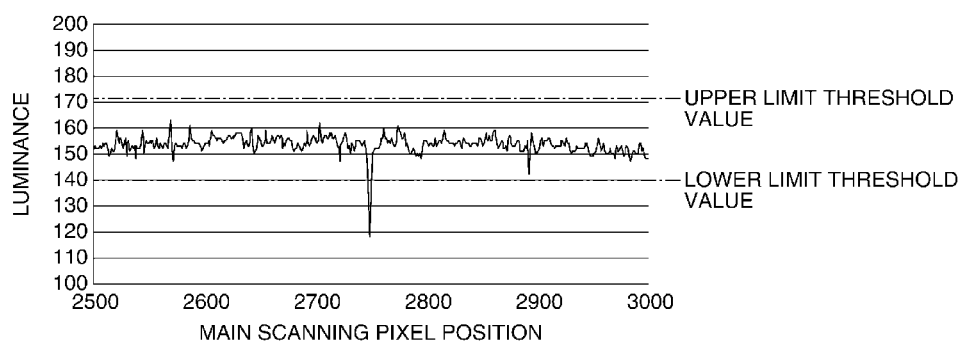
FIG. 9A is a diagram showing the influence of dust stripes formed during singular point determination threshold reference value sampling.

Next, sampling of data for calculating the singular point determination threshold value in the step (2) is performed so as to limit a range serving as reference for data sampling before acquiring data to be sampled for creating shading correction data in the step (3). FIG. 9A shows an example of image data of a sheet sampled when calculating the singular point determination threshold reference value, which is clipped partially in the main scanning direction from the image data. In FIG. 9A, the horizontal axis represents a main scanning pixel position, and the vertical axis represents a read luminance, and the upper limit threshold value and the lower limit threshold value are used as reference values for determining a pixel as a singular point (dust). In FIG. 9A, the read luminance is reduced to approximately 118 in the vicinity of a 2750-th pixel in the main scanning direction, and the luminance of this point is lower than the lower limit threshold value, and hence this point is determined as a singular point.

Unless this point is considered as the singular point, when sampling data for creating shading correction data in the step (3), data is to be sampled with reference to the luminance of this singular point. As a result, the data in the vicinity of the singular point is positively acquired.

As described above, even when data is at the same whiteness, the data cannot be always read at a uniform luminance in the main scanning direction due to variation in characteristics of the reading sensor between pixels, light distribution of the light source, characteristics of the condensing lens, and so on. However, in the case where a drastic change appears as indicated in the vicinity of the 2750-th pixel in FIG. 9A, there is a high possibility that the drastic change is not due to the above-mentioned factors of a change in read value between pixels, but due to abnormality of read data, i.e. existence of a singular point in the data of the object to be read.

Figure 9B:
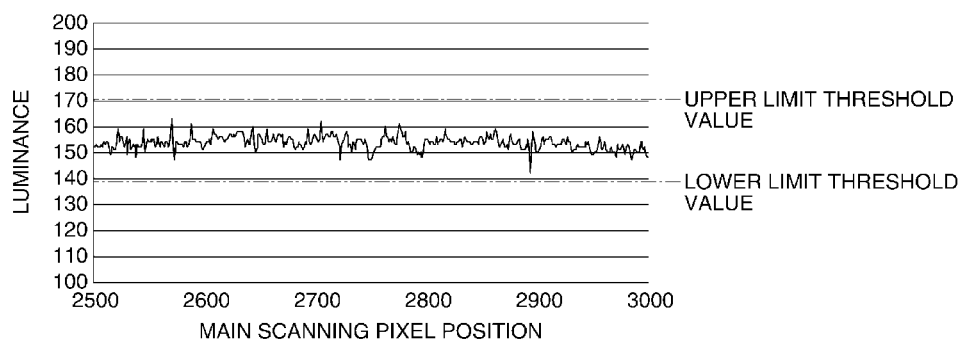
FIG. 9B is a diagram showing reduced influence of the dust stripes in FIG. 9A.

To reduce such influence of the singular point, there is performed the following processing: Data read from a point which is determined to be larger or smaller in luminance value than the associated threshold value is processed so as to cause the same to be temporarily within a range of the determination threshold values, by performing substitution processing for substituting data of an adjacent pixel which is not determined as a singular point or linear interpolation processing for interpolating using data from adjacent pixels. FIG. 9B shows an example of the data obtained after performing linear interpolation processing.

Here, the data is processed so as to cause the same to be temporarily within the range of the determination threshold values because the reading characteristics vary with each pixel as mentioned above, and hence the original shading correction data is not always uniformly read. However, when linear interpolation processing for interpolating using data from adjacent pixels is performed, pixels in the vicinity of the point subjected to linear interpolation processing become locally uniform. This causes the shading correction data to be in a state in which variation in reading characteristics between pixels is locally not reflected.

Therefore, in sampling of data for creating the shading correction data in the next step (3), the data is acquired again based on the singular point determination threshold reference value calculated in the step (2). As a consequence, data in a state where variation in reading characteristics between pixels is more accurately reflected for each pixel is acquired while maintaining a state where the influence of dust is eliminated.

By sampling data based on the singular point determination threshold reference value created as above, it is possible to acquire data suitable for shading correction. That is, it is possible to acquire data suitable for shading correction in a state reduced in the influence of stripes caused by dust existing on a chart or a sheet serving as a white reference or dust generated by conveyance of the sheet.

Sampling of data for creating the shading correction data in the step (3) is performed by sampling only data existing within the predetermined range determined with reference to the singular point determination threshold reference value created in the step (2). More specifically, there is performed processing for judging data existing within the predetermined range determined with reference to the singular point determination threshold reference value calculated in the step (2) as data read in a state hardly influenced by dust, and adopting (sampling) the same as the data for shading correction. Further, there is performed processing for judging data existing out of the predetermined range as data read in a state influenced by dust, and not adopting (sampling) the same as the data for shading correction.

Figure 10A:
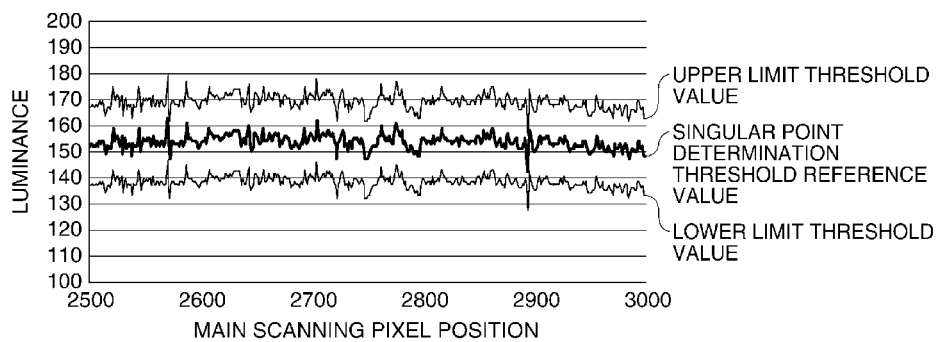
FIG. 10A is a diagram showing threshold values for use in sampling data.
Figure 10B:
FIG. 10B is an enlarged diagram of part of FIG. 10A.

FIG. 10A is a diagram showing threshold values used in sampling data in a case where only data is sampled which exists within a range of ±10% of a luminance serving as the singular point determination threshold reference value indicated in FIG. 9B. Further, FIG. 10B is an enlarged diagram of part of FIG. 10A. In FIGS. 10A and 10B, the upper limit threshold value and the lower limit threshold value are threshold values calculated based on the singular point determination threshold reference value.

By setting the data sampling range as shown in FIGS. 10A and 10B, it is possible to acquire data in a state in which variation in reading characteristics between pixels is reflected. Therefore, also with respect to pixels having data interpolated from adjacent pixel data because of the influence of dust when calculating the singular point determination threshold reference value in the step (2), it is possible to acquire data in a state variation in reading characteristics between pixels is more accurately reflected while maintaining a state where the influence of dust is eliminated. Note that as shown in FIG. 10B, a difference from the adjacent pixel is approximately 10 in terms of luminance level at maximum even when variation in reading characteristics between pixels is taken into account, and hence the data sampling range may be set to be within ±10, in terms of luminance level, of a luminance serving as the singular point determination threshold reference value.

Figure 5:
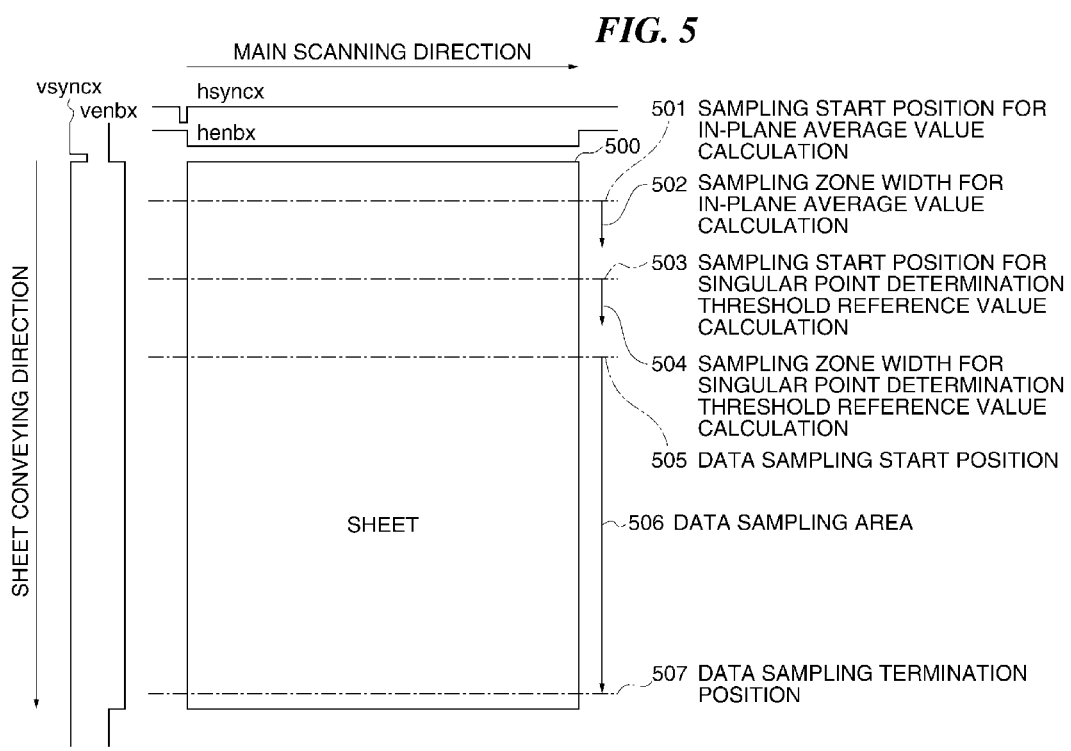
FIG. 5 is a timing diagram showing timings of shading correction data acquisition and the like according to the present embodiment.

FIG. 5 is a timing diagram showing timings of shading correction data acquisition and the like according to the present embodiment. Hereafter, the process will be described mainly with reference to FIGS. 4 and 5, using detailed drawings (e.g. FIGS. 6 to 8) as required.

Referring to FIG. 5, the image processor 300 receives a synchronization signal hsyncx and an enable signal henbx, and a synchronization signal vsyncx and an enable signal venbx, which are generated in the image processing ASIC 202. The synchronization signal hsyncx is a signal indicative of a start position of an image in the main scanning direction, and the enable signal henbx is a signal indicative of an image effective range in the main scanning direction. Further, the synchronization signal vsyncx is a signal indicative of a start position of an image in a sub scanning direction (sheet conveying direction), and the enable signal venbx is a signal indicative of an image effective range in the sub scanning direction. By receiving these signals, it is possible to detect the leading edge and the effective range of the image.

The leading edge of an image on a sheet 500 used to acquire data for shading correction is detected by the synchronization signal vsyncx. A line counter Vcnt (not shown) included in the image processor 300 is started to operate, whereby a timing of data acquisition in the sub scanning direction is generated.

Figure 6:
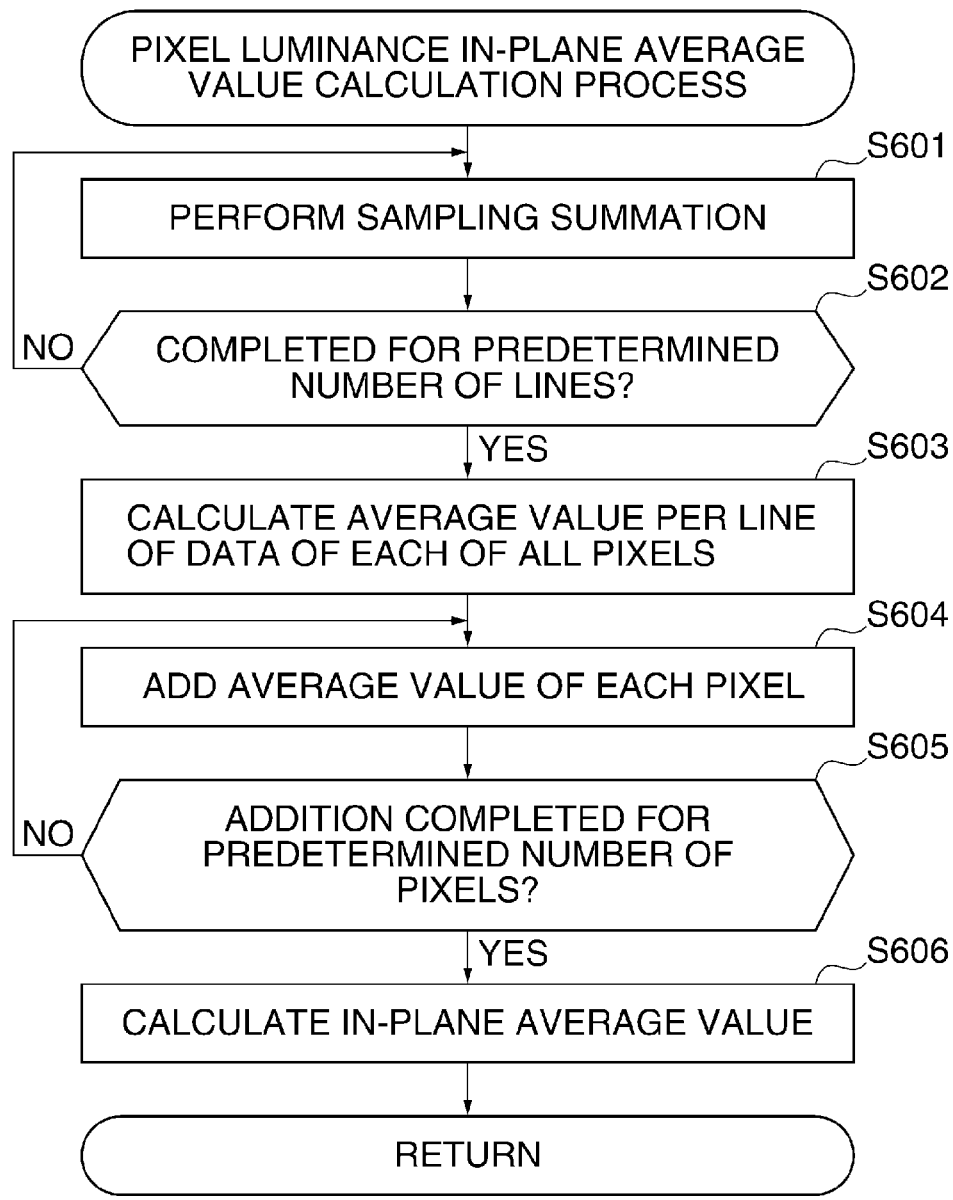
FIG. 6 is a flowchart of a process for calculating an in-plane average value of pixel luminance.

A sampling start position 501 for pixel luminance in-plane average value calculation indicates the start timing of the process for calculating the pixel luminance in-plane average value in the step S401 in FIG. 4. A sampling zone width 502 for pixel luminance in-plane average value calculation indicates the number of lines of sampling data from the sampling start position 501 for pixel luminance in-plane average value calculation. It is possible to know the start and termination timings of data sampling based on a count value of the line counter Vcnt. FIG. 6 shows a flowchart of a process for performing sampling summation on image data on the sheet 500 with respect to all pixels in the main scanning direction within the range of the sampling zone width 502 for pixel luminance in-plane average value calculation to thereby finally calculate the in-plane average value.

Here, details of processing of the sampling summation will be described. For the sampling summation, an area for storing image data (pixel luminance values) is secured in a data storage unit (memory, such as the SRAM), and whenever one line is scanned, current image data is added to data (each pixel luminance value) at the same position in the main scanning direction stored in the SRAM, whereby data obtained by addition is stored in the SRAM again as the data at this position in the main scanning direction. For example, assuming that data on a first line of a 1000-th pixel in the main scanning direction is 200, and data on a second line of the 1000-th pixel in the main scanning direction is 205, data of the 1000-th pixel in the main scanning direction is 405 as a result of sampling summation of the data. This processing is repeated with respect to all pixels in the main scanning direction a number of times corresponding to the predetermined number of lines.

When the line counter Vcnt reaches the count value of the sampling start position 501 for pixel luminance in-plane average value calculation, the operation controller 306 makes settings of operation of the image processor 300, whereby the following process in FIG. 6 is started.

FIG. 6 is a flowchart of the process for calculating the in-plane average value of pixel luminance.

Referring to FIG. 6, the CPU 201 of the image reading apparatus controls the image processing ASIC 202 to perform sampling summation of input image data with respect to all pixels in the main scanning direction (step S601). Next, the CPU 201 determines whether or not sampling summation has been executed with respect to the lines set by the sampling zone width 502 for pixel luminance in-plane average value calculation (step S602). If the count value of the line counter Vcnt has not been counted up to the predetermined number of lines, the process returns to the step S601, and the CPU 201 executes sampling summation again. If sampling summation is completed up to the predetermined number of lines, the process proceeds to a step S603.

The CPU 201 divides a result of sampling summation for each pixel in the step S601 by the number of lines set as the sampling zone width 502 for pixel luminance in-plane average value calculation (step S603). As a result, an average value per line of the pixel luminance value for the set number of lines is calculated for each of all pixels in the main scanning direction. After calculating the average values is completed in the step S603, the CPU 201 adds up the average values of all pixels (step S604).

This addition of the average values may be continuously executed in the vicinity of the central portion of the sheet 500, or may be intermittently executed at each predetermined number of pixels. For example, addition may be performed by setting 512 pixels as one block, and executing addition of four blocks at an appropriate position in the main scanning direction. Note that it is unlikely that accurate data can be acquired from an end portion of the sheet 500 due to the influence of skew or shadow, and hence it is desirable to start addition from a predetermined pixel position and terminate addition at a predetermined pixel position.

Next, the CPU 201 checks whether or not the average values have been added up with respect to the pixels corresponding to a predetermined pixel count specified in advance (step S605). If addition is not completed for the pixels corresponding the predetermined pixel count, the process returns to the step S604, and the CPU 201 continues calculation for adding the average values. If addition is completed for the pixels corresponding to the predetermined pixel count, the process proceeds to a step S606. The CPU 201 divides the sum of the average values of the pixels corresponding to the predetermined pixel count, obtained in the step S604, by the number of the pixels on which addition has been performed (step S606). As a result, the pixel luminance in-plane average value is calculated.

The pixel luminance in-plane average value is calculated in a state where shading correction has been performed based on previous shading correction data obtained e.g. before shipping the image reading apparatus from the factory, by sampling data using a reference white board or the like. The previous shading correction data is stored in a nonvolatile memory, such as the flash memory 205 appearing in FIG. 2. The shading correction data stored in the flash memory 205 is read and used e.g. when the image reading apparatus is powered on or when the reading mode is changed.

Referring back to FIG. 4, after calculation of the pixel luminance in-plane average value is completed as described in detail with reference to FIG. 6 (step S401), the CPU 201 checks whether or not the calculated pixel luminance in-plane average value is a value within a predetermined range (step S402). If it is determined in the step S402 that the pixel luminance in-plane average value is out of the predetermined range, the image processing ASIC 202 under the control of the CPU 201 for execution of the present process sends an error notification to the CPU 201, and the CPU 201 receives the error notification (step S403). Then, the CPU 201 stops acquisition of the shading correction data without executing the subsequent steps. The CPU 201 having received the error notification can display the error message on the console section 210 as required.

As a case where the pixel luminance in-plane average value is a value deviating from the predetermined range (abnormal value), the following cases are considered: a case where color paper, glossy paper which is very high in whiteness, or recycled paper which is very low in whiteness is used as the sheet 500, a case where a normal image cannot be read because the reading glass 120 is very dirty, and a case where normal image output cannot be obtained due to a failure of the line sensor 127. In any case, even if the subsequent steps are executed according to the flow in FIG. 4, acquisition of accurate shading correction data cannot be expected.

If it is determined in the step S402 that the pixel luminance in-plane average value is a value within the predetermined range, the CPU 201 detects a singular point existing in the image data read from a chart or a sheet conveyed by the ADF 102 before sampling the shading correction data, and further performs a sampling process for singular point determination threshold reference value calculation for sampling data while eliminating singular points (step S404). A step S405 et seq. will be described after describing the sampling process for singular point determination threshold reference value calculation in FIG. 7.

Note that the sampling process for singular point determination threshold reference value calculation in the step S404 is started when the line counter Vcnt has counted up to a sampling start position 503 for singular point determination threshold reference value calculation in the timing diagram in FIG. 5. A sampling zone width 504 for singular point determination threshold reference value calculation in the timing diagram in FIG. 5 indicates the number of lines of sampling data from the sampling start position 503 for singular point determination threshold reference value calculation. Sampling of data is terminated based on the count value of the line counter Vcnt.

Figure 7:
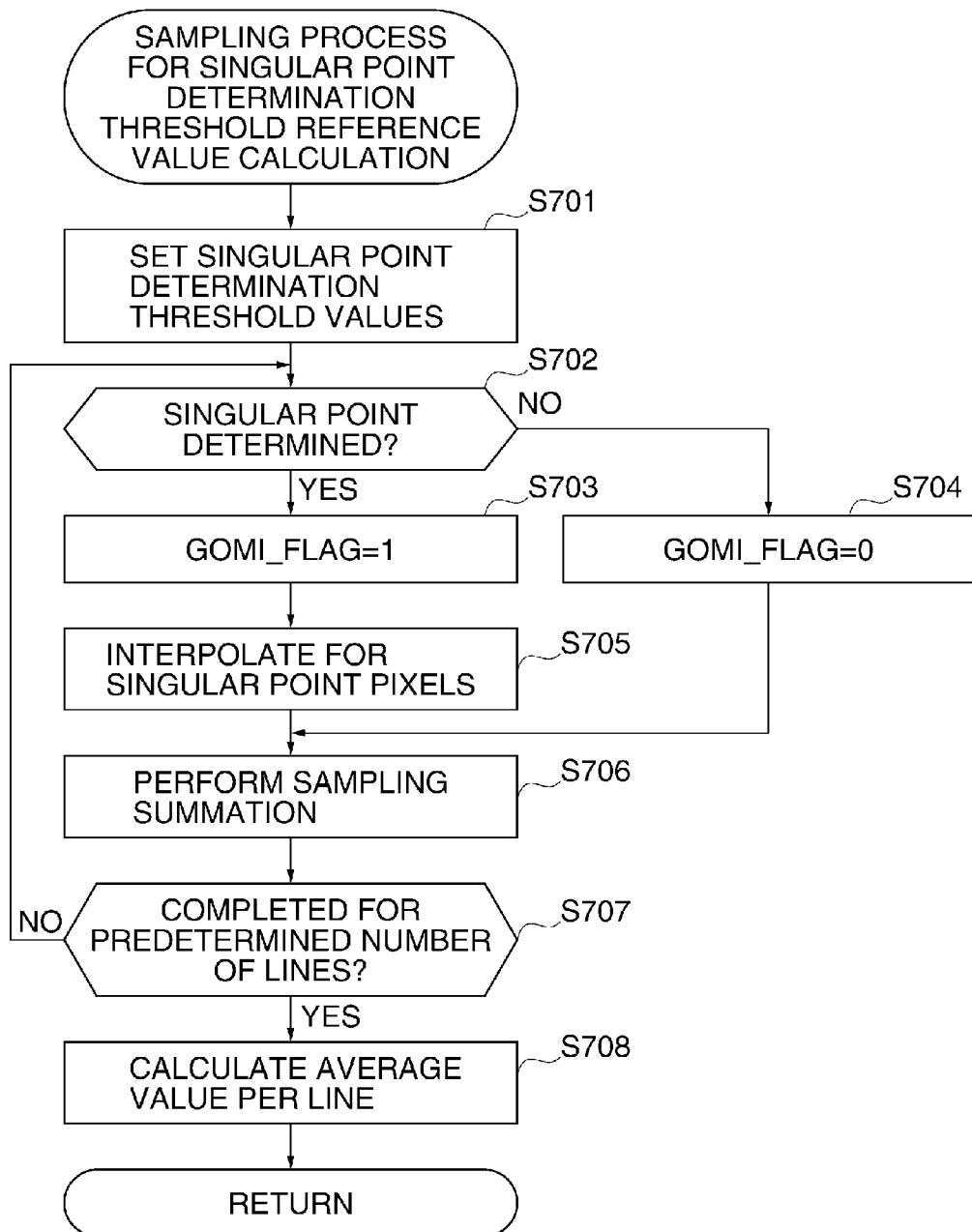
FIG. 7 is a flowchart of a sampling process for singular point determination threshold reference value calculation.

FIG. 7 shows the sampling process for singular point determination threshold reference value calculation in which sampling summation of image data on the sheet 500 is performed for all pixels within the range of the sampling zone width 504 for singular point determination threshold reference value calculation to thereby finally calculate the singular point determination threshold reference value.

FIG. 7 is a flowchart of the sampling process for singular point determination threshold reference value calculation.

Referring to FIG. 7, the CPU 201 of the image reading apparatus sets the singular point determination threshold values for calculating the final singular point determination threshold reference value (step S701). The singular point determination threshold values can be set according to at least the following three patterns (1), (2), and (3):

(1) A case where the singular point determination threshold values are set as an allowable fluctuation width with respect to the pixel luminance in-plane average value calculated in the step S401:

For example, assuming that the in-plane average value is 200 in terms of luminance level, and the singular point determination threshold values are set to ±15% of the in-plane average value, pixels which are higher in luminance level than 230 and pixels which are lower in luminance level than 170 are determined as singular points. In this case, sampling of data is performed in the following manner: Singular point determination is performed with respect to image data subjected to shading correction using the previous shading correction data, and based on the results of determination, sampling is performed on data which has been subjected to interpolation calculation for points determined as singular points in a step S705 in FIG. 7 but has not been subjected to shading correction.

(2) A case where the singular point determination threshold values are set as an allowable fluctuation width of absolute luminance levels with respect to the image data subjected to shading correction using the previous shading correction data:

For example, when the upper limit luminance level and the lower limit luminance level are set to 210 and 170, respectively, pixels which are larger in luminance level than 210 and pixels which are lower in luminance level than 170 are determined as singular points. Also in this case, data is sampled in the following manner: Singular point determination is performed with respect to image data subjected to shading correction using the previous shading correction data, and based results of the determination, sampling is performed on data which has been subjected to interpolation calculation for points determined as singular points in a step S705 in FIG. 7 and has not been subjected to shading correction.

(3) A case where the singular point determination threshold values are set as an allowable fluctuation width of absolute luminance levels with respect to the image data which has not been subjected to shading correction:

For example, when the upper limit luminance level and the lower limit luminance level are set to 200 and 100, respectively, pixels which are larger in luminance level than 200 and pixels which are smaller in luminance level than 100 are determined as singular points. In this case, a comparison operation is performed between image data which has not been subjected to shading correction and the threshold value, and hence pixels at an end portion in the main scanning direction, where an amount of light is markedly reduced, is more liable to be determined as singular points. Therefore, it is necessary to cope with this e.g. by setting a start position and a termination position of singular point determination in the main scanning direction.

Next, the CPU 201 controls the singular point determination circuit 303 to perform singular point determination according to the singular point determination threshold values set in the step S701 (step S702). In this singular point determination processing, the singular point determination circuit 303 performs a comparison operation between the input image signal and the singular point determination threshold values with respect to all pixels in the main scanning direction using the expressions (5) and (6). If a pixel is determined as a singular point by the singular point determination circuit 303, the CPU 201 notifies the singular point substitution circuit 304 by setting a dust flag for the pixel determined as the singular point (step S703). If a pixel is not determined as a singular point, the CPU 201 notifies the singular point substitution circuit 304 without setting the dust flag for the pixel not determined as the singular point (step S704).

Next, the CPU 201 controls the singular point substitution circuit 304 having received the dust flag to execute processing for interpolation for the singular point pixel (step S705). Interpolation for the singular point pixel is performed, as described hereinabove, by the method of simple substitution or the method of linear interpolation from adjacent pixels. Note that singular point interpolation processing in the step S705 is not executed on pixels which are not determined as singular points and hence for which the dust flag is not set in the step S702.

Next, the CPU 201 executes sampling summation for each pixel at the same position in the main scanning direction regardless of whether or not the pixel is subjected to substitution by being determined as a singular point (step S706). Next, the CPU 201 determines whether or not sampling summation in the step S706 is completed for the predetermined number of lines (step S707). If sampling summation is not completed for the predetermined number of lines, the CPU 201 returns to the step S702 to repeatedly execute singular point determination processing, interpolation processing, and sampling summation for image data of the next line in the steps S702 to S706, respectively.

If sampling summation is completed for the predetermined number of lines, the CPU 201 divides data obtained sampling summation (sum of sampled data) by the predetermined number of lines to thereby calculate an average value per line of each pixel at the same position in the main scanning direction (step S708). This completes the sampling process for singular point determination threshold reference value calculation. Note that that the above-described singular point determination threshold reference values are stored in the SRAM 308 as data for all pixels in the main scanning direction.

Referring back to FIG. 4, after the sampling process for singular point determination threshold reference value calculation in the step S404 is completed, the CPU 201 performs a shading correction data sampling process based on the singular point determination threshold reference values calculated in the step S404 (step S405). The process in the step S405 is started when the line counter Vcnt has counted up to a data sampling start position 505 in the timing diagram in FIG. 5, and a range between the data sampling start position 505 to a data sampling termination position 507 is set as a data sampling area 506. A step S406 et seq. will be described after describing the shading correction data sampling process with reference to FIG. 8.

Even before the line counter Vcnt has counted up to the data sampling termination position 507, the data sampling process is to be terminated when sampling of data from all pixels of the predetermined number of lines is completed. That is, the settings of the data sampling termination position 507 have a meaning that the process is to be stopped if sampling of data from the predetermined number of lines is not completed up to the data sampling termination position 507.

Figure 8:
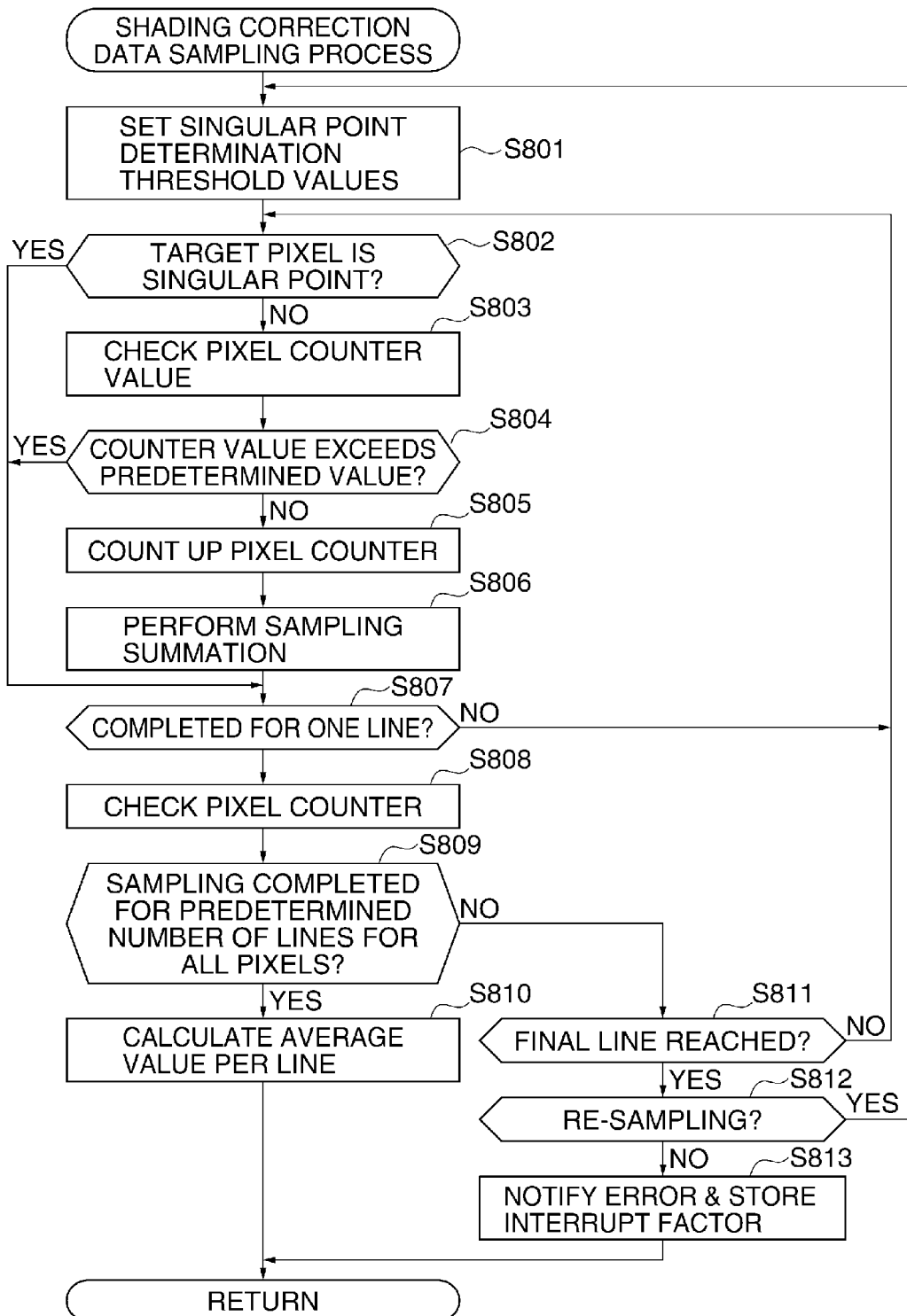
FIG. 8 is a flowchart of a shading correction data sampling process.

FIG. 8 shows the shading correction data sampling process for performing sampling summation of image data on the sheet 500 with respect to all pixels within the range of the data sampling area 506 to thereby acquire final shading correction data.

FIG. 8 is a flowchart of the shading correction data sampling process.

Figure 12:
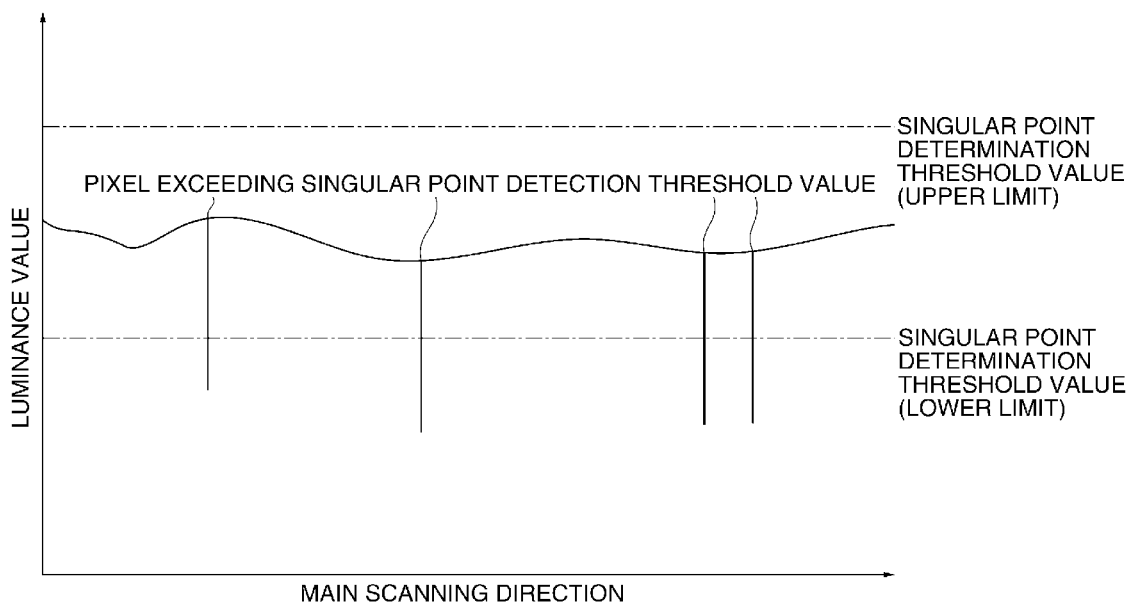
FIG. 12 is a diagram useful in explaining singular point determination performed in a step of the sampling process for singular point determination threshold reference value calculation in FIG. 7.

Referring to FIG. 8, the CPU 201 of the image reading apparatus sets the singular point determination threshold values (step S801). The singular point determination threshold values (the upper limit threshold values and lower limit threshold values in FIGS. 10A and 10B) are set such that pixels having luminance values within a range of ±10 with respect to the respective associated singular point determination threshold reference values stored in the SRAM 308 by the sampling process for singular point determination threshold reference value calculation in FIG. 7 are determined as pixels to be sampled, and data of pixels outside this range (singular point) are determined as not to be sampled. FIG. 12 is a diagram useful in explaining singular point determination performed in the step S702 in FIG. 7. The above-mentioned singular point determination threshold reference values are values obtained by the sampling process for singular point determination threshold reference value calculation in FIG. 7 in which singular point pixels are detected and data of the singular point pixels is interpolated from data of the surrounding pixels.

Figure 13:
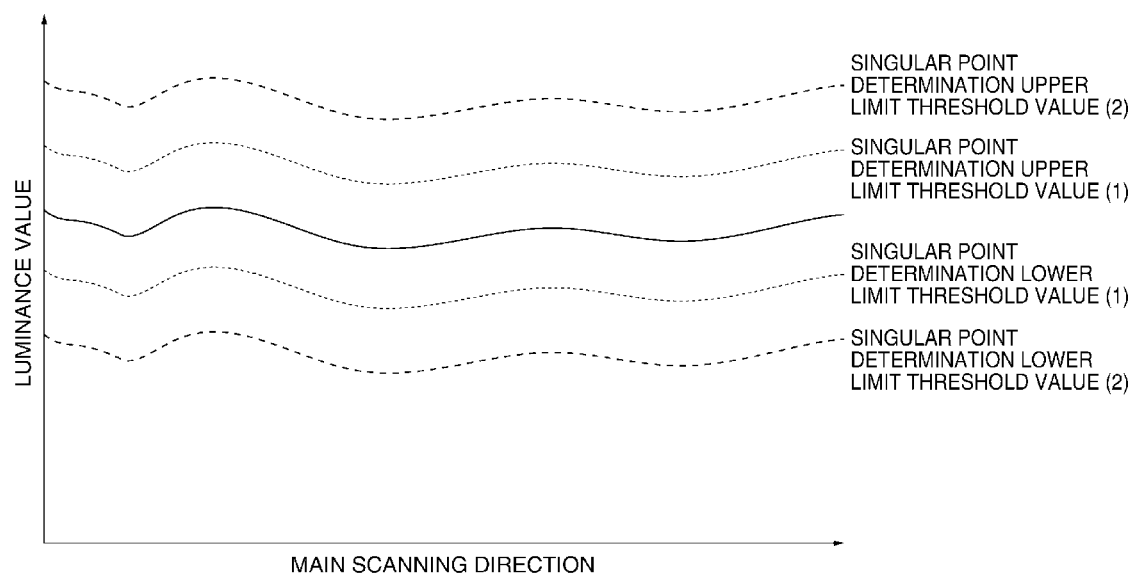
FIG. 13 is a diagram useful in explaining a singular point determination threshold reference value used in the shading correction data sampling process in FIG. 8.

Next, the CPU 201 determines whether or not a pixel is a singular point with reference to the singular point determination threshold values set in the step S801 (see "singular point determination upper limit threshold value" and "singular point determination lower limit threshold value" in FIG. 13) (step S802). Each point determined as the singular point in the determination in the step S802 is not subjected to processing in the following steps S803 to S806. FIG. 13 is a diagram useful in explaining threshold values with reference to which whether or not each pixel is to be sampled is determined in the shading correction data sampling process in FIG. 8, and which are set based on the associated singular point determination threshold reference value obtained by the sampling process for singular point determination threshold reference value calculation in FIG. 7.

Next, the CPU 201 checks the count value of a pixel counter (not shown) with respect to the pixel which is not determined as a singular point in the step S802, i.e. the pixel determined as an object to be sampled (step S803). Note that the count value of the pixel counter is stored in the SRAM 308 for each of pixels in the main scanning direction. Next, the CPU 201 determines whether or not the count value of the pixel counter checked in the step S803 exceeds a predetermined value (a predetermined number of lines for sampling summation) (step S804).

If the count value of the pixel counter does not exceed the predetermined value, the process proceeds to a step S805, whereas if the count value of the pixel counter exceeds the predetermined value, the process proceeds to a step S807 without executing the following steps S805 and S806. In the case where the count value of the pixel counter does not exceed the predetermined value, the CPU 201 counts up the pixel counter only with respect to the pixel determined as the object to be sampled in the step S802 (step S805). Further, the CPU 201 performs sampling summation of data only with respect to the pixel determined as the object to be sampled in the step S802 (step S806).

Next, the CPU 201 determines whether or not processing of the steps S802 to 806 has been executed for one line of pixels (step S807). If the steps S802 to 806 have not been executed for one line of pixels, the process returns to the step S802, wherein the CPU 201 continues the process. If the processing of the steps S802 to 806 has been executed for one line of pixels, the process proceeds to a step S808, wherein the CPU 201 checks the count value of the pixel counter counted in the step S805 with respect to all pixels (step S808).

Next, the CPU 201 checks with respect to all pixels whether or not the count value of the pixel counter checked in the step S808 reaches a predetermined value, i.e. whether or not sampling of data has been performed for a predetermined number of lines (step S809). If the count value of the pixel counter reaches the predetermined value with respect to all pixels, the process proceeds to a step S810. In this case, a sufficient number of data items can be sampled for each of all pixels, and hence the CPU 201 performs averaging for calculating shading correction data (step S810), followed by terminating the present sampling process.

Figure 11:
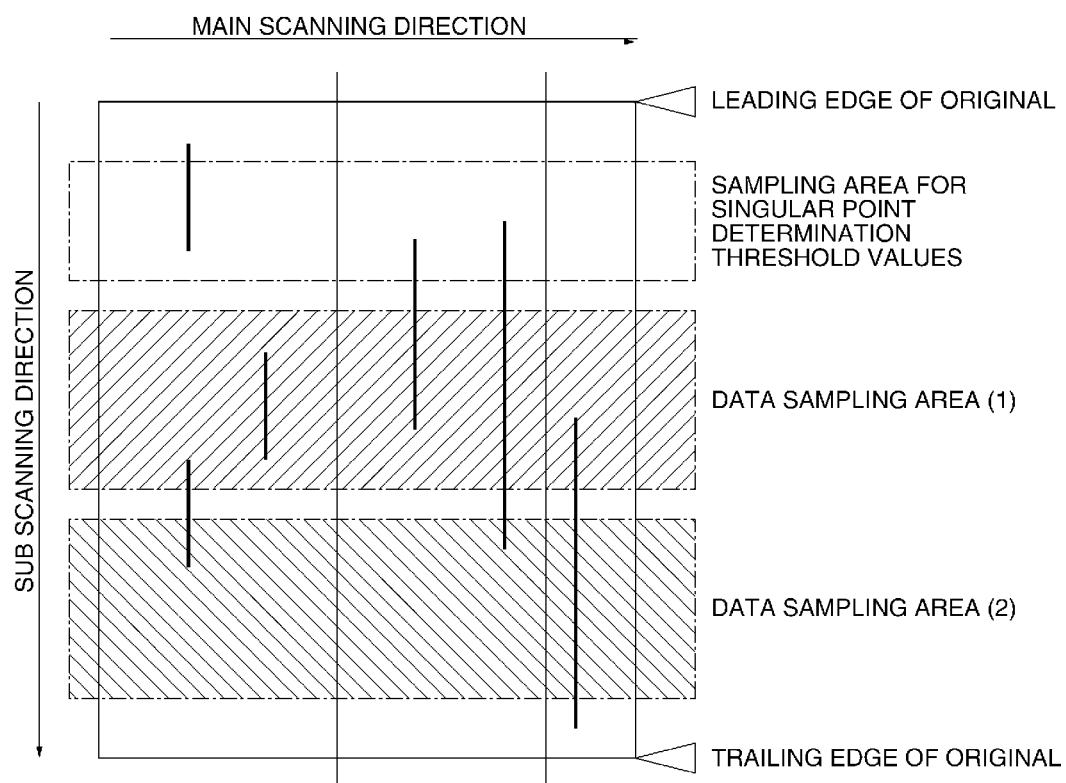
FIG. 11 is a diagram showing data sampling areas in FIG. 5.

If the count value of the pixel counter does not reach the predetermined value with respect to all pixels, the process proceeds to a step S811. That is, as a result of checking the count value of the pixel counter in the step S809, if it was impossible to complete sampling of a sufficient number of data items with respect to any of all pixels, the CPU 201 performs the following determination: The CPU 201 determines whether or not the final line of the designated sampling area has been reached (step S811) (see a data sampling area (1) in FIG. 11). FIG. 11 is a diagram useful in explaining the data sampling area 506 in FIG. 5 in further detail. As shown in FIG. 11, it is also possible to divide the data sampling area into a plurality of areas (data sampling areas (1) and (2)).

If it is determined in the step S811 that the final line of the designated data sampling area has not been reached, the process returns to the step S802 for the CPU 201 to perform sampling summation. If it is determined that the final line of the designated data sampling area has been reached, the process proceeds to a step S812, wherein the CPU 201 determines whether or not a plurality of data sampling areas are set and sampling of data has been executed on all data sampling areas (step S812). Details of a plurality of times of data sampling will be described hereinafter.

If sampling of data has not been executed on all data sampling areas, the process returns to the step S801 for the CPU 201 to perform processing again from the setting of the singular point determination threshold values. More specifically, along with a shift to the data sampling area (2) in FIG. 11, the CPU 201 changes the singular point determination threshold values in a relaxing direction, as indicated by the singular point determination threshold reference values (2) in FIG. 13. Note that the singular point determination threshold values can be changed not only in the direction of relaxing the determination but also in a direction of making the determination strict.

If sampling of data has been executed on all data sampling areas, the process proceeds to a step S813. The image processing ASIC 202 under the control of the CPU 201 for execution of the present process notifies, the CPU 201 of an interrupt factor indicating that sampling of data could not be completed under the designated conditions, as an error. The CPU 201 receives the notification, and stores the interrupt factor in a register (step S813), followed by terminating the present sampling process. The CPU 201 having received this notification can display an error message on the console section 210 as required.

When the above-described process is terminated, the shading correction data sampling process in the step S405 in FIG. 4 is completed, and the process proceeds to the step S406, wherein the CPU 201 compares the number of singular points with a predetermined threshold value, based on the information of the singular points determined in the shading correction data sampling process in the step S405. As a result of the comparison, if the number of singular points is not less than the predetermined threshold value, the process proceeds to a step S407, wherein the CPU 201 receives dirt information sent from the image processing ASIC 202 (step S407). To indicate a possibility that a desired result has not been obtained because there are a lot of singular points, a message can be displayed on the console section 210.

Figure 14:
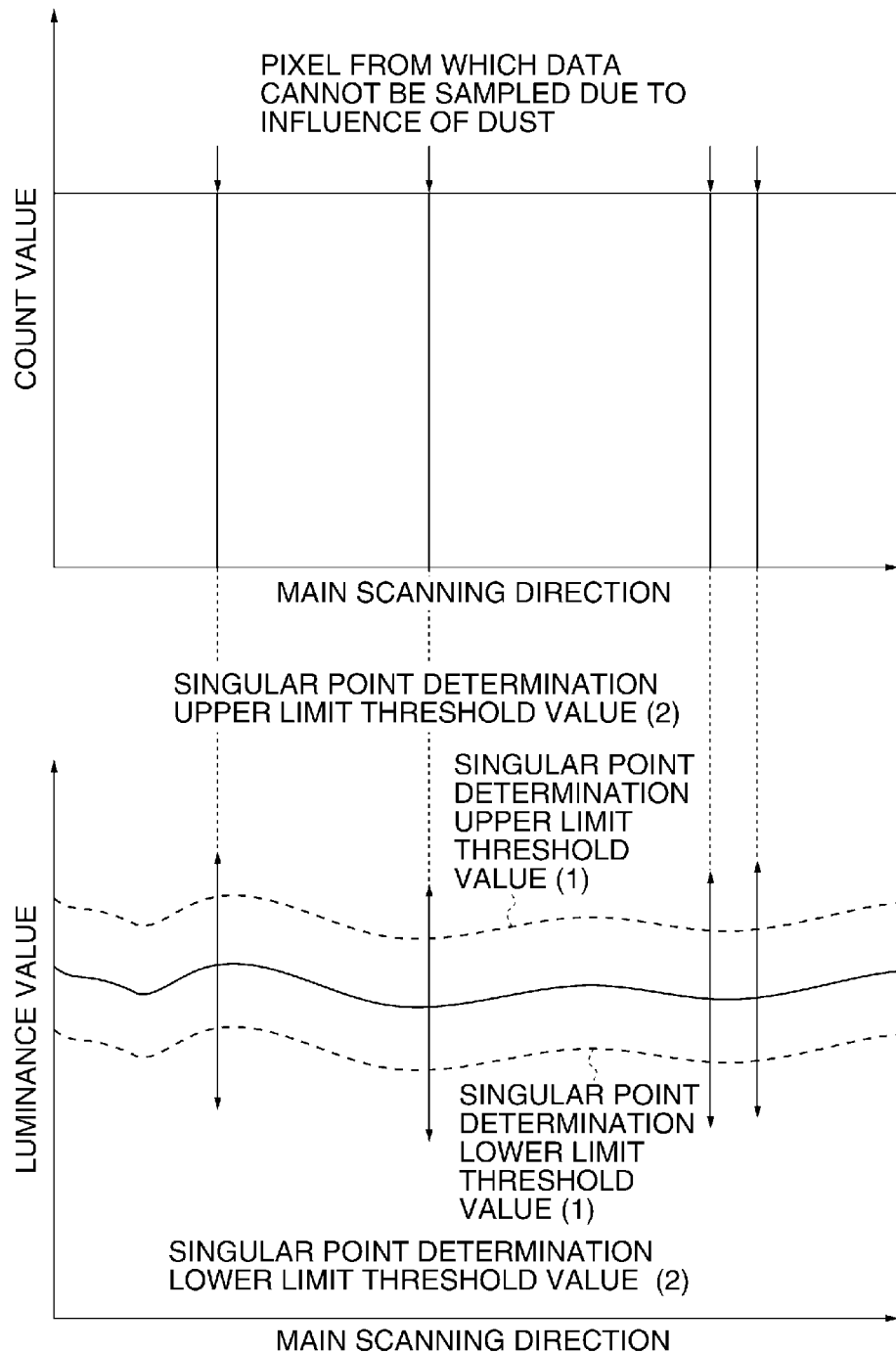
FIG. 14 is a diagram useful in explaining a change of the singular point determination threshold reference value used in the shading correction data sampling process in FIG. 8.

As described above, in the step S812 in the shading correction data sampling process in FIG. 8, the plurality of sampling areas are set as shown in FIG. 11, and the CPU 201 determines whether or not sampling of data has been executed for all of the data sampling areas. If it is determined in the step S812 that sampling of data has been executed for the data sampling area (1) in FIG. 11, but not for the data sampling area (2), the process returns to the step S801, and the CPU 201 performs processing again from the setting of the singular point determination threshold values. The resetting of the singular point determination threshold values can be performed by any of the following three method (1), (2), and (3):

(1) A case where the threshold values are relaxed only for singular points:

FIG. 14 is a diagram useful in explaining a change of the singular point determination threshold values in the step S801 in the shading correction data sampling process in FIG. 8. As shown in the upper part of FIG. 14, the positions of pixels in the main scanning direction, which cannot be sampled e.g. due to the influence of stripes and dust, extracted based on the count values of the pixel counter stored in the SRAM 308. As a consequence, as shown in the lower part of FIG. 14, it is possible to change the singular point determination threshold values only at each corresponding position. As described above, the singular point determination circuit 303 functions as an identifying unit of the present invention configured to identify, when a pixel from which image data cannot be sampled exists, a position of the pixel from which image data cannot be sampled.

By thus changing the singular point determination threshold values, it is possible to continue sampling of data which can be sampled without being influenced by dust in a state maintaining the levels of the threshold values. To sample data from a pixel from which image data has not been sampled due to the influence of dust in the first data sampling area, sampling of data is executed in a state where the levels of the threshold values are slightly relaxed, whereby it is possible to increase the possibility of completing the sampling of data.

(2) A case where data is sampled again by relaxing the threshold values only for singular points:

Further, when data has been sampled from pixels in the first data sampling area, the data may be stored in the SRAM 308, and sampling of data may be performed in a state where the levels of the threshold values are slightly relaxed only for pixels from which data could not be sampled.

The above-mentioned method (1) has the following possibility: If data is influenced by stripes caused by dust accidentally generated in the second data sampling area, there is a possibility that as for some pixels, using the same threshold values, data can be sampled in the first data sampling area but cannot be sampled in the second data sampling area. However, the present method can reduce the possibility.

(3) A case where data is sampled in a superimposed manner by relaxing the threshold values only for singular points:

In a case where data could not be sampled for a pixel up to the predetermined count value in the first data sampling area, sampling of data from the corresponding pixel can be continued in a state where the levels of the threshold values are slightly relaxed until the count value reaches the predetermined value. That is, the result of addition of data sampled using the first singular point determination threshold values up to a certain count value is stored, and data sampled using the second singular point determination threshold values is added to the stored result of addition.

This method is effective for the following case, as shown in the data sampling area (1) in FIG. 11: a case where there is a stripe that appears from an intermediate portion of the data sampling area, and disappears at an intermediate portion of the data sampling area, or a case where the sheet is remarkably dirt, and hence data has been sampled only from a few number of lines.

By employing one of the above methods (1), (2), and (3), it is possible to generate accurate shading correction data even when data is influenced by stripes caused by dirt on a white reference chart (sheet) itself or dust generated when the white reference chart is conveyed.

As shown in FIG. 11, in a case where occurrence of a stripe is always caused in both of the data sampling area (1) and the data sampling area (2), there is the following possibility: There may be a pixel from which data cannot be sampled even when the singular point determination threshold values are relaxed, or a plurality of times of sampling data is executed.

To cope with this, in the shading correction data sampling process in FIG. 8, when the process proceeds from the step S812 (re-sampling determination) to the step S813 (error notification), the following process can be executed: Data is interpolated based on the result of the step S808 (check of the pixel counter) and the previously sampled data stored in the nonvolatile memory (flash memory 205). The singular point substitution circuit 304 functions as the interpolation unit that interpolates data of the pixel which is identified by the singular point determination circuit 303 and for which the sampling cannot be completed, using the previously sampled data stored in the flash memory 205 (first storage unit).

Figure 15:
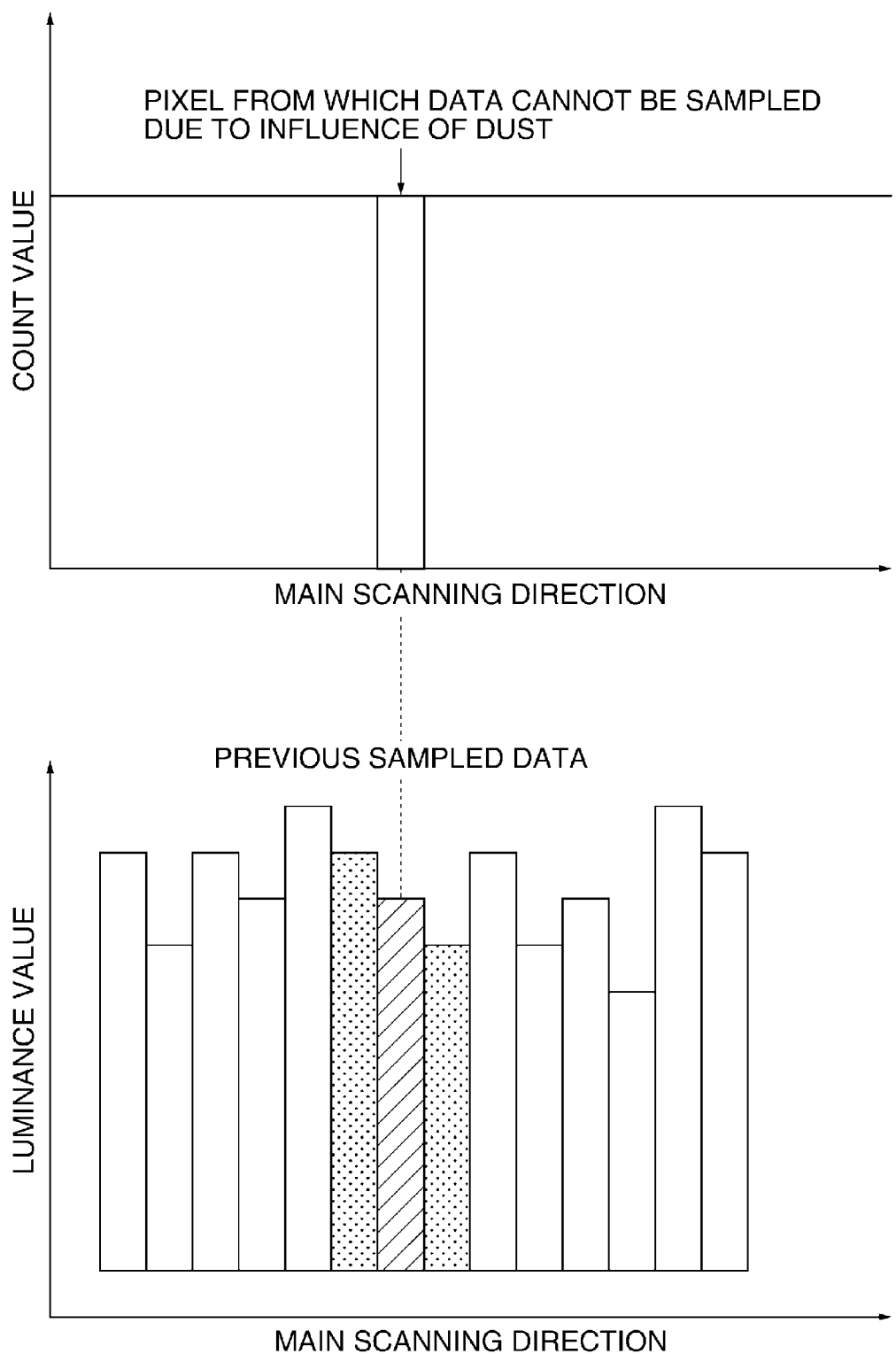
FIG. 15 is a diagram useful in explaining data interpolation from adjacent pixels.

More specifically, as shown in FIG. 15, if there is a pixel which is determined to be a singular point and from which data cannot be sampled, a ratio of a value of previously sampled data at the pixel and a value of the same at a pixel adjacent thereto is calculated. A value of data sampled this time for the adjacent pixel is divided by the ratio (interpolation coefficient), whereby the data of the pixel influenced by dust, i.e. of the singular point is interpolated. By employing this method, even when the data is influenced by continuous stripes caused by fixed dust generated when the white reference chart (sheet) is conveyed, it is possible to generate accurate shading correction data.

As described above, according to the present embodiment, before shading correction data is sampled by the image reading apparatus, sampling is performed by the same for calculating the singular point determination threshold reference value with reference to which an allowable range of data sampling is to be defined. Only data which is within the range is adopted (sampled), and data which is outside the range is excluded from the sampling target. This makes it possible to generate shading correction data from which the influence of stripes caused by dirt and dust is reduced.

Further, even when the white reference chart is dirty, or the chart has stripes caused by dust generated during conveyance of the chart, it is possible to reduce the influence of dirt and stripes, and generate shading correction data having an average brightness uniform in plane. Particularly, even when a sheet including dust and dirt, such as recycled paper, is used as a white reference chart, it is possible to generate excellent shading correction data, and hence it is not necessary to prepare a specially managed chart. Further, even in a case where it is impossible to sufficiently clean dust, such as paper dust, from the original conveying section of the image reading apparatus, it is possible to reduce the influence of stripes caused by the dust, and hence it is also possible to reduce costs for managing and adjusting the image reading apparatus.

Although in the present embodiment, the image reading apparatus that is capable of performing both moving image reading and platen reading has been described, this is not limitative, but the present embodiment can be applied to an image reading apparatus that is capable of performing only platen reading which does not involve conveying of an original.

Although in the present embodiment, the image reading apparatus only has been described, this is not limitative, but the present embodiment can be applied to a copy machine or a multifunction peripheral equipped with the image reading apparatus of the present invention.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-076172 filed Apr. 2, 2014, which is hereby incorporated by reference herein in its entirety.

What is claimed is:

1. An original reading apparatus, comprising:
a conveying unit configured to convey an original set on a tray;
a sensor configured to read the original conveyed by the conveying unit and to output pixel data of the read original;
at least one memory; and
at least one processor connected to the at least one memory and configured by one or more programs stored in the at least one memory at least to:
set a threshold value based on the pixel data in a first region of a reference sheet conveyed by the conveying unit;
determine whether or not target pixel data in a second region of the reference sheet is a singular-point pixel, the second region being located downstream of the first region with respect to a conveying direction of the conveying unit;
for each of main-scanning positions, count the number of pixel data that have not been determined as the singular-point pixel;
for each of the main-scanning positions, cumulatively sum the pixel data that have not been determined as the singular-point pixel if a count value corresponding to a main-scanning position of the pixel data is smaller than a predetermined number; calculate the shading correction data using data obtained by cumulatively summing the predetermined number of the target pixel data that have not been determined as the singular-point pixel; and
perform shading correction on the pixel data output from the sensor, based on the shading correction data.

2. The original reading apparatus according to claim 1, wherein the processor is further configured to calculate an average value of the pixel data in a third region of the reference sheet, and to issue an error notification if the average value is out of a predetermined range, and
wherein the third region is located upstream of the second region in the conveying direction of the conveying unit direction.

3. The original reading apparatus according to claim 1, wherein the processor is further configured to set the threshold value based on the average value of the pixel data in the first region of the reference sheet.

4. The original reading apparatus according to claim 1, further comprising a display configured to notify a user of an error if the number of pixel data that have been determined as the singular-point pixel is not less than a predetermined value.

* * * * *